United States Patent
Fujii et al.

(10) Patent No.: US 12,166,435 B2
(45) Date of Patent: Dec. 10, 2024

(54) TRANSPORT SYSTEM, PROCESSING SYSTEM, AND ARTICLE MANUFACTURING METHOD

(71) Applicant: CANON KABUSHIKI KAISHA, Tokyo (JP)

(72) Inventors: Nobuaki Fujii, Kanagawa (JP); Takeshi Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 17/566,276

(22) Filed: Dec. 30, 2021

(65) Prior Publication Data

US 2022/0224255 A1   Jul. 14, 2022

(30) Foreign Application Priority Data

Jan. 12, 2021 (JP) ................................ 2021-003049
Nov. 24, 2021 (JP) ................................ 2021-190122

(51) Int. Cl.
*H02N 15/00* (2006.01)
*H01F 7/20* (2006.01)

(52) U.S. Cl.
CPC ............. *H02N 15/00* (2013.01); *H01F 7/202* (2013.01)

(58) Field of Classification Search
CPC ........ H02N 15/00; H01F 7/202; H02K 41/03; B65G 54/02
USPC ...................................................... 361/239
See application file for complete search history.

(56) References Cited

U.S. PATENT DOCUMENTS

2014/0320058 A1* 10/2014 Takagi ................. H02K 41/031
                                                    318/632

FOREIGN PATENT DOCUMENTS

| JP | 4987014 B2 * | 7/2012 | ............. C23C 14/12 |
| JP | 2013-102570 A | 5/2013 | |
| JP | 5753060 B2 | 7/2015 | |
| KR | 726711 B1 * | 6/2007 | ............. B65G 54/02 |
| KR | 100726711 B1 | 6/2007 | |

OTHER PUBLICATIONS

Machine translation of Kawakami et al. Japanese Patent Document JP 4987014 B2 Jul. 2012 (Year: 2012).*
Machine translation of Hwang et al. Korean Patent Document KR 100726711 B1 Jun. 2007 (Year: 2007).*

* cited by examiner

*Primary Examiner* — Kevin J Comber
(74) *Attorney, Agent, or Firm* — Canon U.S.A., Inc. IP Division

(57) ABSTRACT

A transport system includes a mover, a stator, and a control unit. The mover moves in a first direction. The stator includes a plurality of coils arranged in the first direction and applies force to transport the mover in the first direction while using the plurality of coils, to which current is applied, to levitate the mover in a second direction intersecting the first direction. The control unit controls the current applied to the plurality of coils to control operation of the mover. The control unit controls the current applied to the plurality of coils using machine difference information of the mover to control an attitude of the mover while the mover is being levitated.

17 Claims, 27 Drawing Sheets

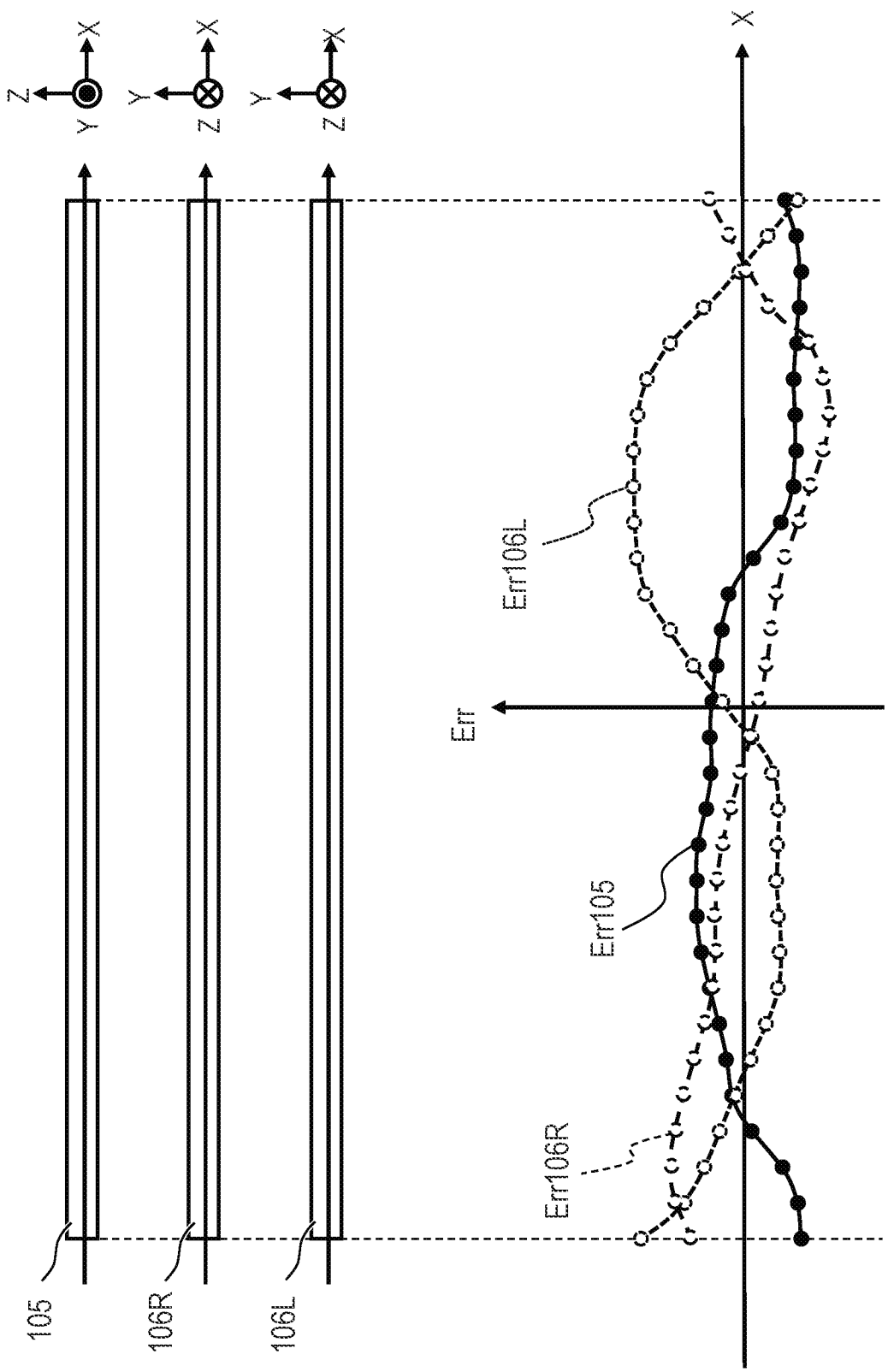

TRANSPORT SYSTEM, PROCESSING SYSTEM, AND ARTICLE MANUFACTURING METHOD

BACKGROUND

Field

The present disclosure relates to a transport system, a processing system, and a method of manufacturing an article.

Description of the Related Art

In general, a transport system is used in a production line used for assembling industry products, a semiconductor exposure apparatus, or the like. In particular, a transport system in a production line transports workpieces such as components by a plurality of movers between a plurality of stations within a factory-automated production line or between factory-automated production lines. Further, such a transport system may be used as a transport apparatus within a process apparatus. As transport systems, a transport system using a linear motor and a magnetic levitation transport system have already been proposed.

In these transport systems, a plurality of movers transport workpieces such as components, and each of the movers has movement machine difference, which is a position error at the time of its movement due to a machining error or an assembly error of the reading surface of the sensor.

Accordingly, Japanese Patent No. 5753060 discloses a method of controlling the current flow of electromagnets so as to stop a carriage at a target stop position by using data for correcting the position of each carriage, which is determined based on a movement machine difference of each carriage, which is measured in advance using a common measuring jig, in a transport system using a linear motor.

SUMMARY

According to an aspect of the present disclosure, a transport system includes a mover configured to be movable in a first direction, a stator having a plurality of coils arranged in the first direction and configured to apply force to transport the mover in the first direction while using a plurality of coils, to which current is applied, to levitate the mover in a second direction intersecting the first direction, and a control unit configured to control the current applied to the plurality of coils to control operation of the mover, wherein the control unit is configured to control the current applied to the plurality of coils using machine difference information of the mover to control an attitude of the mover while the mover is being levitated.

Further features of the present disclosure will become apparent from the following description of exemplary embodiments with reference to the attached drawings.

BRIEF DESCRIPTION OF THE DRAWINGS

FIG. 6 is a schematic diagram illustrating an example of data acquired in the method of acquiring the correction value for correcting the movement machine difference of the mover in the first embodiment transport system of the present disclosure.

DESCRIPTION OF THE EMBODIMENTS

First Embodiment

A first embodiment of the present disclosure will be described below with reference to FIG. 1 to FIG. 17.

Figure 1:
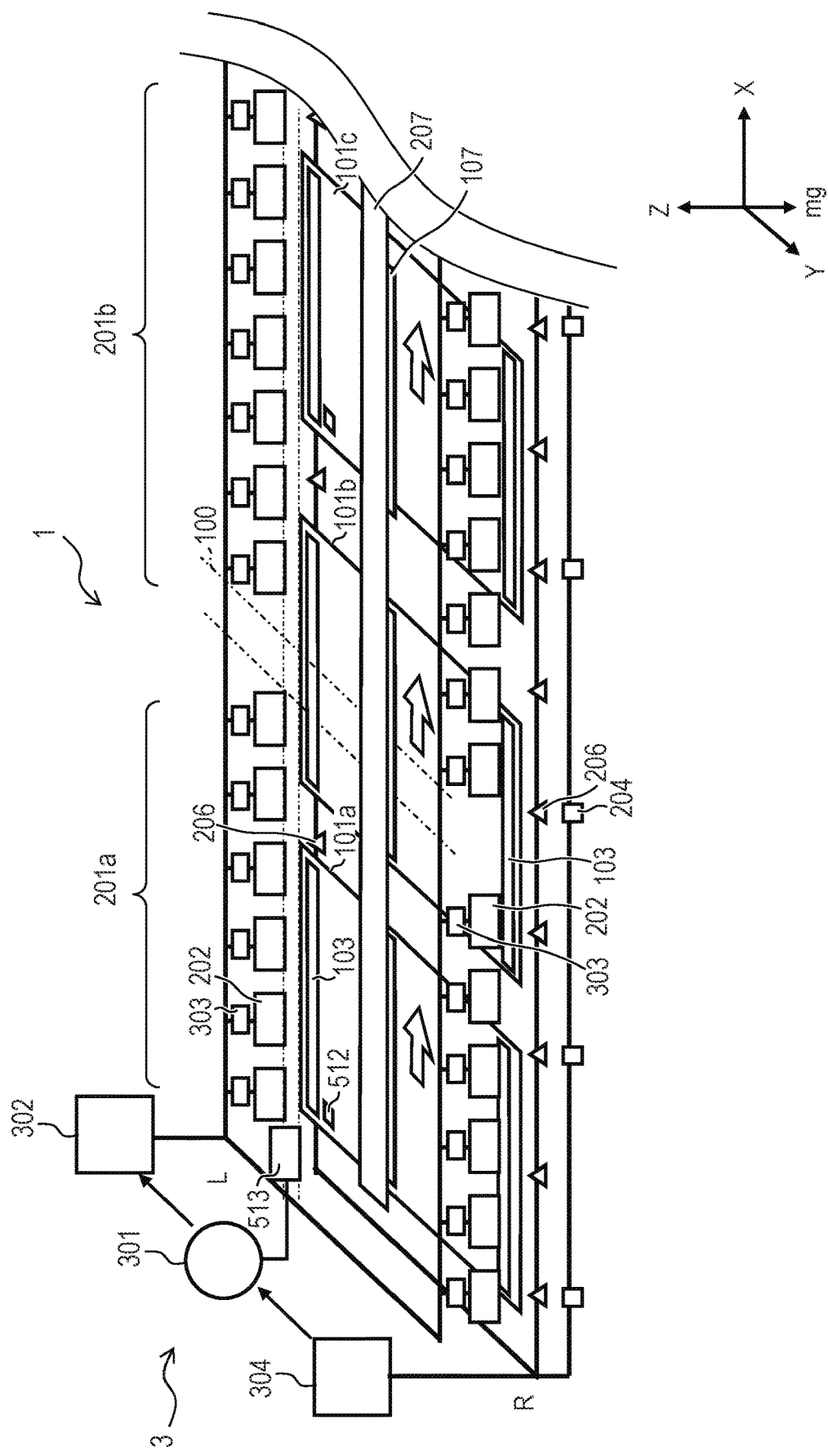
FIG. 1 is a schematic diagram illustrating a configuration of a transport system according to a first embodiment of the present disclosure.
Figure 2:
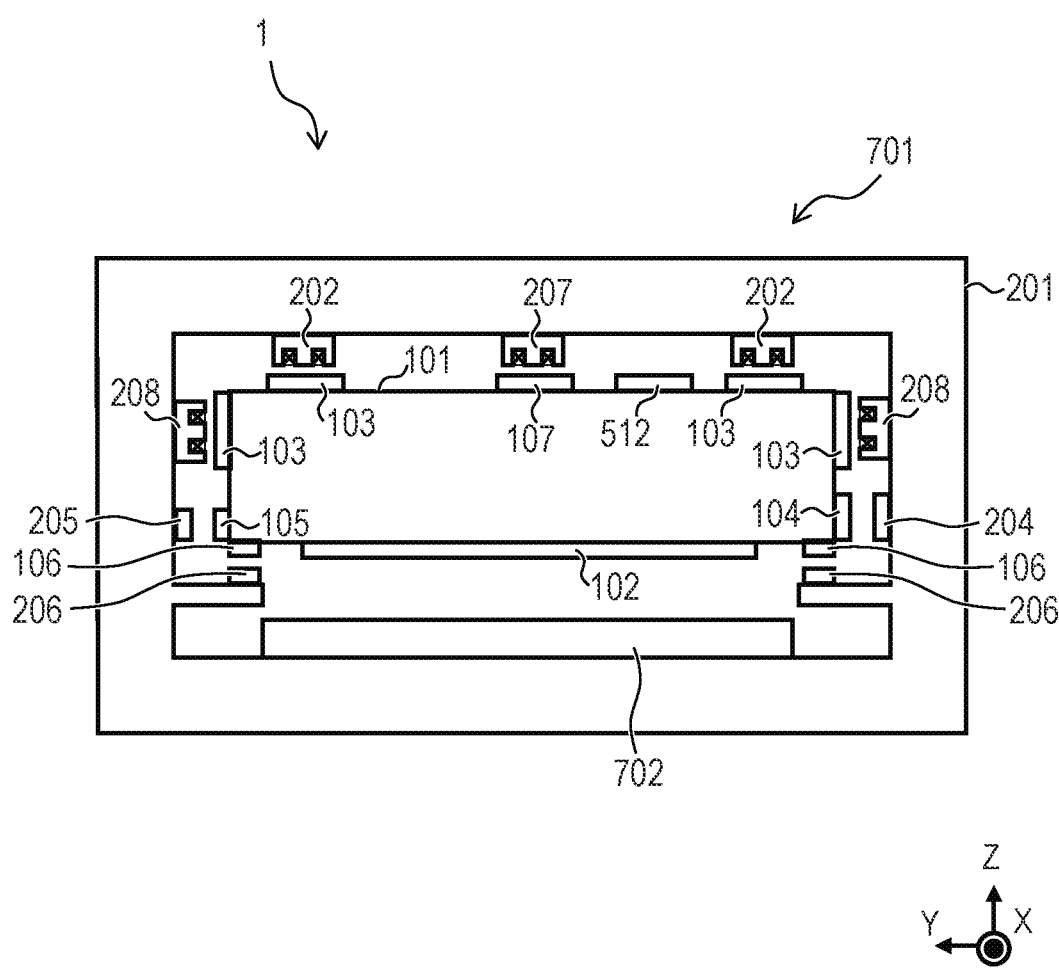
FIG. 2 is a schematic diagram illustrating the configuration of the transport system according to the first embodiment of the present disclosure.
Figure 3:
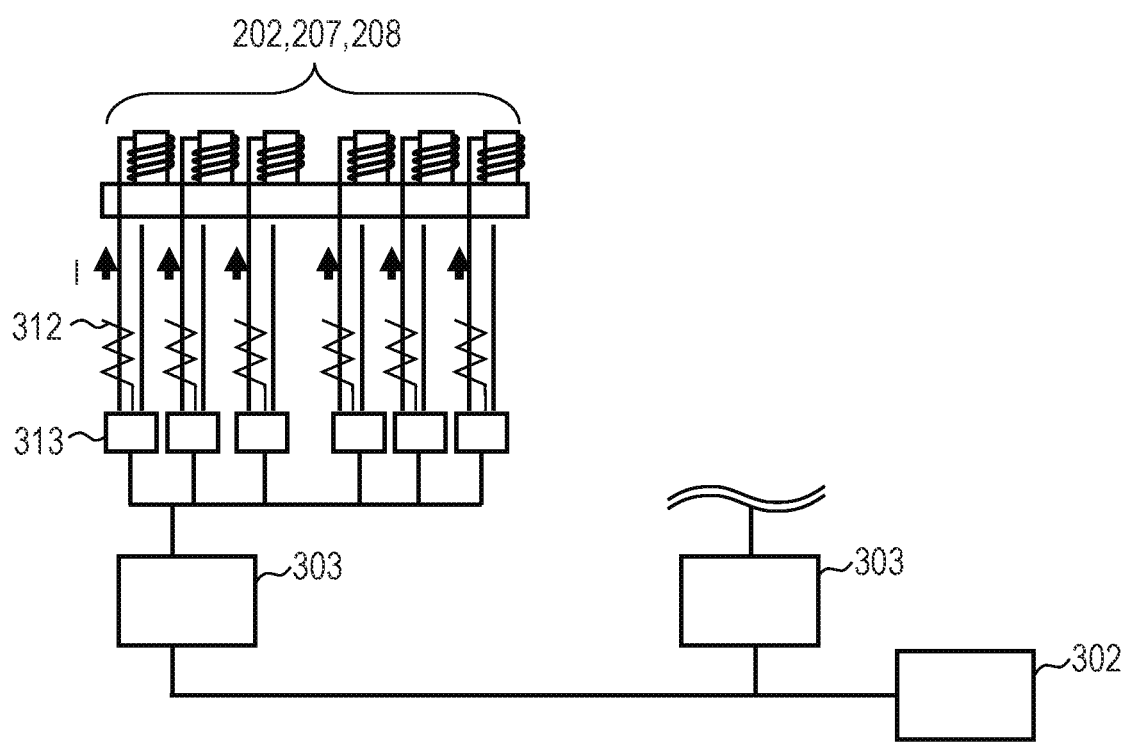
FIG. 3 is a schematic diagram illustrating a coil and coil related configuration in the transport system according to the first embodiment of the present disclosure.

First, a configuration of a transport system 1 according to the present embodiment will be described with reference to FIG. 1 to FIG. 3. FIG. 1 and FIG. 2 are schematic diagrams illustrating the configuration of the transport system 1 including movers 101 and stators 201 according to the present embodiment. Note that FIG. 1 and FIG. 2 are views of extracted main portions of each mover 101 and each stator 201, respectively. Further, FIG. 1 is a diagram of the mover 101 when viewed from a diagonally upper side, and FIG. 2 is a diagram of the mover 101 and the stator 201 when viewed from the X direction described later. FIG. 3 is a schematic diagram illustrating coils 202, 207, and 208 and a configuration related to the coils 202, 207, and 208 in the transport system 1.

As illustrated in FIG. 1 and FIG. 2, the transport system 1 according to the present embodiment has the mover 101 forming a carrier, a carriage, or a slider and the stator 201 forming a transport path. Further, the transport system 1 has an integration controller 301, coil controllers 302, coil unit controllers 303, and a sensor controller 304. Note that FIG. 1 illustrates three movers 101a, 101b, and 101c as the mover 101 and two stators 201a and 201b as the stator 201. In the following description, a reference including only the numeral common to others is used when it is not particularly required to distinguish components that may be present as multiple components, such as the mover 101 and the stator 201, and a lowercase alphabet is appended to a numeral reference to distinguish the individuals if necessary. Further, when a component of the mover 101 on the R side and a component on the L side of the mover 101 are distinguished from each other, "R" indicating the R side or "L" indicating the L side is appended to the lowercase alphabet.

The transport system 1 according to the present embodiment is a transport system with an inductive type linear motor that generates electromagnetic force between the coil 207 of the stator 201 and a conductive plate 107 of the mover 101 and applies the thrust in the X direction to the mover 101. Further, the transport system 1 according to the present embodiment is a magnetic levitation type transport system that causes the mover 101 to levitate and transports the mover 101 in a contactless manner. The transport system 1 according to the present embodiment forms a part of a processing system having a process apparatus together that performs processing on a workpiece 102 transported by the mover 101.

The transport system 1 transports the workpiece 102 held by the mover 101 to a process apparatus that performs a processing operation on the workpiece 102 by transporting the mover 101 by the stator 201, for example. The process apparatus is not particularly limited and may be, for example, a film forming apparatus such as a vapor deposition apparatus, a sputtering apparatus, or the like to form a film on a glass substrate that is the workpiece 102. Note that, although FIG. 1 illustrates three movers 101 for two stators 201, the number is not limited thereto. In the transport system 1, one or a plurality of movers 101 may be transported on one or a plurality of stators 201.

Herein, coordinate axes, directions, and the like used in the following description are defined. First, the X-axis is taken along the horizontal direction that is the transport direction of the mover 101, and the transport direction of the mover 101 is defined as the X direction. Further, a Z-axis is taken along the perpendicular direction that is a direction orthogonal to the X direction, and the perpendicular direction is defined as a Z direction. The perpendicular direction corresponds to a direction of the gravity (mg direction). Further, a Y-axis is taken is taken along a direction orthogonal to the X direction and the Z direction, and the direction orthogonal to the X direction and the Z direction is defined as a Y direction. Furthermore, a rotation direction around the X-axis is defined as a Wx direction, a rotation direction around the Y-axis is defined as a Wy direction, and a rotation direction around the Z-axis is defined as a Wz direction. Further, "*" is used as a multiplication symbol. Further, the center of the mover 101 is defined as origin Oc, the Y+ side is denoted as R side, and the Y− side is denoted as L side. Note that, although the transport direction of the mover 101 is not necessarily required to be a horizontal direction, the Y direction and the Z direction can be similarly defined also in such a case with the transport direction being defined as the X direction. Note that the X direction, the Y direction, and the Z direction are not necessarily limited to directions orthogonal to each other and can be defined as directions intersecting each other. Further, the displacement in the transport direction is defined as the position, the displacement in other directions as the attitude, and the position and the attitude are together defined as the state.

Further, symbols used in the following description are as follows. Note that each symbol is used for respective cases of the coils 202, 207, and 208 in a duplicated manner.

Oc: the origin of the mover 101
Os: the origin of the linear scale 104
Oe: the origin of stator 201
j: index for identifying a coil
(Note that j is an integer satisfying 1≤j≤N, where N is an integer greater than or equal to two.)
N: the number of installed coils Ij: current amount applied to the j-th coil
P: state including the position and the attitude of the mover 101 (X, Y, Z, Wx, Wy, Wz)
X(j, P): X-coordinate of the j-th coil when viewed from the center of the mover 101 in a state P
Y(j, P): Y-coordinate of the j-th coil when viewed from the center of the mover 101 in a state P
Z(j, P): Z-coordinate of the j-th coil when viewed from the center of the mover 101 in a state P
T: force applied to mover 101
Tx: force component in the X direction of force T
Ty: force component in the Y direction of force T
Tz: force component in the Z direction of force T
Twx: torque component in the Wx direction of force T
Twy: torque component in the Wy direction of force T
Twz: torque component in the Wz direction of force T
Ex(j, P): force in the X direction working on the mover 101 in the state P when unit current is applied to the j-th coil
Ey(j, P): force in the Y direction working on the mover 101 in the state P when unit current is applied to the j-th coil
Ez(j, P): force in the Z direction working on the mover 101 in the state P when unit current is applied to the j-th coil
Σ: sum when index j is changed from 1 to N
*: product of matrix or vector
M: torque contribution matrix
K: pseudo-current vector (column vector)
Tq: torque vector (column vector)
Is: coil current vector (column vector)
Fs: coil force vector (column vector)
M(a, b): element on the a-th row and on the b-th column of the matrix M
Inv( ) inverse matrix
Tr( ) transpose matrix
Tr(element 1, element 2, . . . ): column vector whose elements are element 1, element 2, . . .

As indicated by arrows in FIG. 1, the mover 101 is configured to be movable in the X direction that is the transport direction. The mover 101 has yoke plates 103 and a conductive plate 107. Further, the mover 101 has a linear scale 104, a Y-target 105, and Z-targets 106. The mover 101 further includes an RFID (Radio Frequency Identification) tag 512, which is an information medium in which identification information for identifying each mover 101 is registered.

A plurality of yoke plates 103 are attached and installed on a plurality of portions of the mover 101. Specifically, the yoke plates 103 are attached and installed along the X direction at respective ends on the R side and the L side on the top face of the mover 101. Further, the yoke plates 103 are attached and installed along the X direction at respective side faces on the R side and the L side of the mover 101. Each yoke plate 103 is an iron plate made of a substance having a large magnetic permeability, for example, iron.

The conductive plate 107 is attached and installed along the X direction at the center part on the top face of the mover 101. The conductive plate 107 is not particularly limited as long as it has conductivity, such as a conductive metal plate, and an aluminum plate or the like having a small electric resistance is preferable.

Note that the installation places of yoke plates 103 and conductive plate 107 and the number thereof are not limited to the example described above and may be changed as appropriate.

The linear scale 104, the Y-target 105, and the Z-target 106 are attached and installed in the mover 101 at positions that can be read by the linear encoder 204, the Y-sensor 205, and the Z-sensor 206 installed on the stator 201, respectively.

The RFID tag 512 is attached to the mover 101 to be installed in the mover 101 at a position readable by a RFID reader 513. The RFID reader 513 is installed at a specific position of a transport path of the mover 101 in the transport system 1. An individual ID (Identification) as identification information is registered in the RFID tag 512 so as to identify the mover 101 to which the RFID tag 512 is attached. Instead of the RFID tag 512, the mover 101 may be provided with an information medium such as a QR code (registered trademark) indicating an individual ID of the mover 101. In this case, instead of the RFID reader 513, a reader such as a scanner that reads the individual ID from the information medium can be used according to the information medium.

The stator 201 has the coils 202, 207, and 208, the linear encoder 204, the Y-sensor 205, and the Z-sensor 206.

A plurality of coils 202 are attached and installed along the X direction on the stator 201 so as to be able to face, along the Z direction, the yoke plate 103 installed on the top face of the mover 101. Specifically, the plurality of coils 202 are arranged and installed in two lines parallel to the X direction so as to be able to face, from the top in the Z direction, the two yoke plates 103 installed at respective ends on the R side and the L side on the top face of the mover 101.

A plurality of coils 208 are attached and installed along the X direction to the stator 201 so as to be able to face, along the Y direction, the yoke plates 103 installed on the side face of the mover 101. Specifically, the plurality of coils 208 are arranged and installed in two lines parallel to the X direction so as to be able to face, from the side in the Y direction, the two yoke plates 103 installed on respective side faces on the R side and the L side of the mover 101.

A plurality of coils 207 are attached and installed along the X direction on the stator 201 so as to be able to face, along the Z direction, the conductive plate 107 installed on the top face of the mover 101. Specifically, the plurality of coils 207 are arranged and installed in a single line parallel to the X direction so as to be able to face, from the top in the Z direction, the conductive plate 107 installed at the center part on the top face of the mover 101.

The stator 201 applies force to the mover 101 that is movable in the transport direction by respective coils 202, 207, and 208 to which current is applied. Thereby, the mover 101 is transported in the transport direction while the position and the attitude thereof are controlled.

Note that the installation places of the coils 202, 207, and 208 are not limited to the examples described above and may be changed as appropriate. Further, the number of installed coils 202, 207, and 208 may be changed as appropriate.

The linear encoder 204, the Y-sensor 205, and the Z-sensor 206 function as a detection unit that detects the position and the attitude of the mover 101 that moves in the transport direction.

The linear encoder 204 is attached and installed on the stator 201 so as to be able to read the linear scale 104 installed on the mover 101. The linear encoder 204 detects the relative position to the linear encoder 204 of the mover 101 by reading the linear scale 104.

The Y- sensor 205 is attached and installed on the stator 201 so as to be able to detect the distance in the Y direction to the Y-target 105 installed on the mover 101. The Z-sensor 206 is attached and installed on the stator 201 so as to be able to detect the distance in the Z direction to the Z-target 106 installed on the mover 101.

The mover 101 is configured to be transported with the workpiece 102 attached or held above or under the mover 101, for example. Note that FIG. 2 illustrates a state where the workpiece 102 is attached under the mover 101. Note that the mechanism used for attaching or holding the workpiece 102 to the mover 101 is not particularly limited, and a general attaching mechanism, a general holding mechanism, or the like such as a mechanical hook, an electrostatic chuck, or the like may be used.

Note that FIG. 2 illustrates a case where the mover 101 and the stator 201 are embedded inside a chamber of a vapor deposition apparatus 701 that is an example of the process apparatus that performs a processing operation on the workpiece 102. The vapor deposition apparatus 701 has a vapor deposition source 702 that performs deposition on the workpiece 102 attached to the mover 101. The vapor deposition source 702 is installed on a lower part inside the chamber of the vapor deposition apparatus 701 so that the vapor deposition source 702 can face the workpiece 102 attached under the mover 101. With vapor deposition using the vapor deposition source 702, a thin film of a metal, an oxide, or the like is formed on a substrate that is the workpiece 102 attached under the mover 101 transported to an installation place of the vapor deposition source 702. In such a way, the workpiece 102 together with the mover 101 is transported, processing is performed on the transported workpiece 102 by the process apparatus, and an article is manufactured.

Further, FIG. 1 illustrates a region including a place where a structure 100 such as a gate valve, for example, is present between the stator 201a and the stator 201b. The place where the structure 100 is present is a place which is located between a plurality of stations within a production line or between production lines and where continuous arrangement of electromagnets or coils is not possible.

A control system 3 that controls the transport system 1 is provided to the transport system 1. Note that the control system 3 may form a part of the transport system 1. The control system 3 has the integration controller 301, the coil controllers 302, the coil unit controllers 303, and the sensor controller 304. The coil controllers 302 and the sensor controller 304 are connected to the integration controller 301 in a communicable manner. The plurality of coil unit controllers 303 are connected to the coil controller 302 in a communicable manner. The plurality of linear encoders 204, the plurality of Y-sensors 205, and the plurality of Z-sensors 206 are connected to the sensor controller 304 in a communicable manner. The coils 202, 207, and 208 are connected to each coil unit controller 303 (see FIG. 3).

The integration controller 301 determines current instruction values to be applied to the plurality of coils 202, 207, and 208 based on the output from the linear encoder 204, the Y-sensor 205, and the Z-sensor 206 transmitted from the sensor controller 304. The integration controller 301 transmits the determined current instruction values to the coil controllers 302. The coil controller 302 transmits the current instruction values received from the integration controller 301 to respective coil unit controllers 303. The coil unit controller 303 controls the current amounts of the connected coils 202, 207, and 208 based on the current instruction values received from the coil controller 302.

The RFID reader 513 is connected to the integration controller 301 in a communicable manner. The RFID reader 513 acquires the individual ID of the mover 101 by reading the RFID tag 512 of the mover 101. The RFID reader 513 transmits the acquired individual ID to the integration controller 301. The integration controller 301 can receive and recognize the individual ID of the mover 101 transmitted from the RFID reader 513 to identify the mover 101. The RFID reader 513 is installed at one or a plurality of positions in the transport path constituted by the stator 201.

As illustrated in FIG. 3, one or a plurality of coils 202, 207, and 208 are connected to each coil unit controller 303. A current sensor 312 and a current controller 313 are connected to each of the coils 202, 207, and 208. The current sensor 312 detects the current value flowing in the connected coils 202, 207, and 208. The current controller 313 controls the current amount flowing in the connected coils 202, 207, and 208.

The coil unit controller 303 instructs the current controller 313 for a desired current amount and a timing for flowing the current based on the current instruction value received from the coil controller 302. The current controller 313 detects the current value detected by the current sensor 312 and controls the current amount so that current of a desired current amount flows in individual coils 202, 207, and 208.

Figure 4:
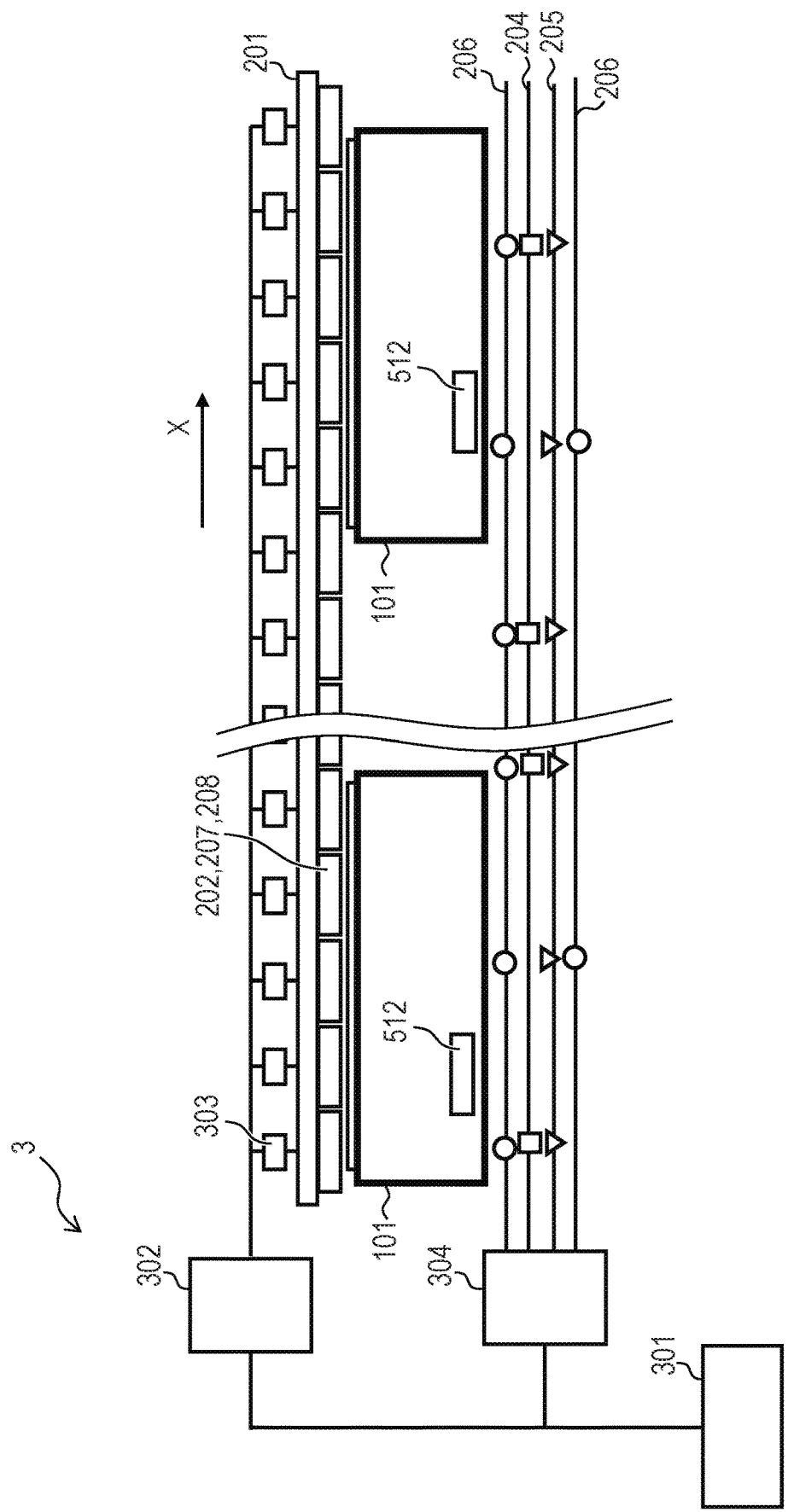
FIG. 4 is a schematic diagram illustrating a control system for controlling the transport system according to the first embodiment of the present disclosure.

Next, the control system 3 that controls the transport system 1 according to the present embodiment will be further described with reference to FIG. 4. FIG. 4 is a schematic diagram illustrating the control system 3 that controls the transport system 1 according to the present embodiment.

As illustrated in FIG. 4, the control system 3 has the integration controller 301, the coil controller 302, the coil unit controllers 303, and the sensor controller 304. The control system 3 functions as a control unit that controls the transport system 1 including the mover 101 and the stator 201. The coil controller 302, the sensor controller 304, and the RFID reader 513 are connected to the integration controller 301 in a communicable manner.

The plurality of coil unit controllers 303 are connected to the coil controller 302 in a communicable manner. The coil controller 302 and the plurality of coil unit controllers 303 connected thereto are provided in association with respective columns of the coils 202, 207, and 208. The coils 202, 207, and 208 are connected to each coil unit controller 303. The coil unit controller 303 can control the level of the current of the connected coils 202, 207, and 208.

The coil controller 302 instructs target current values to each of the connected coil unit controllers 303. The coil unit controller 303 controls the current amount of the connected coils 202, 207, and 208.

The plurality of linear encoders 204, the plurality of Y-sensors 205, and the plurality of Z-sensors 206 are connected to the sensor controller 304 in a communicable manner.

The plurality of linear encoders 204 are attached to the stator 201 at intervals such that one of the linear encoders 204 can always measure the position of one mover 101 even during transportation of the mover 101. Further, the plurality of Y-sensors 205 are attached to the stator 201 at intervals such that two of the Y-sensors 205 can always measure the Y-target 105 of one mover 101. Further, the plurality of Z-sensors 206 are attached to the stator 201 at intervals such that three of the two lines of Z-sensors 206 can always measure the Z-target 106 of one mover 101 and so as to form a plane.

The integration controller 301 determines current instruction values to be applied to the plurality of coils 202 based on the output from the linear encoders 204, the Y-sensors 205, and the Z-sensors 206 and transmits the current instruction values to the coil controllers 302. The coil controller 302 instructs the coil unit controllers 303 for the current value and the timing for flowing the current based on the current instruction values from the integration controller 301 as described above. Accordingly, the integration controller 301 functions as a control unit to transport the mover 101 in a contactless manner along the stator 201 and control the attitude of the transported mover 101 in six axes.

The integration controller 301 can identify the mover 101 by the individual ID of the mover 101 received from the RFID reader 513 that has read the RFID tag 512 attached to the mover 101. Thus, the integration controller 301 can control the operation of the movers 101 by applying individual parameters to the respective movers 101.

Figure 5A:
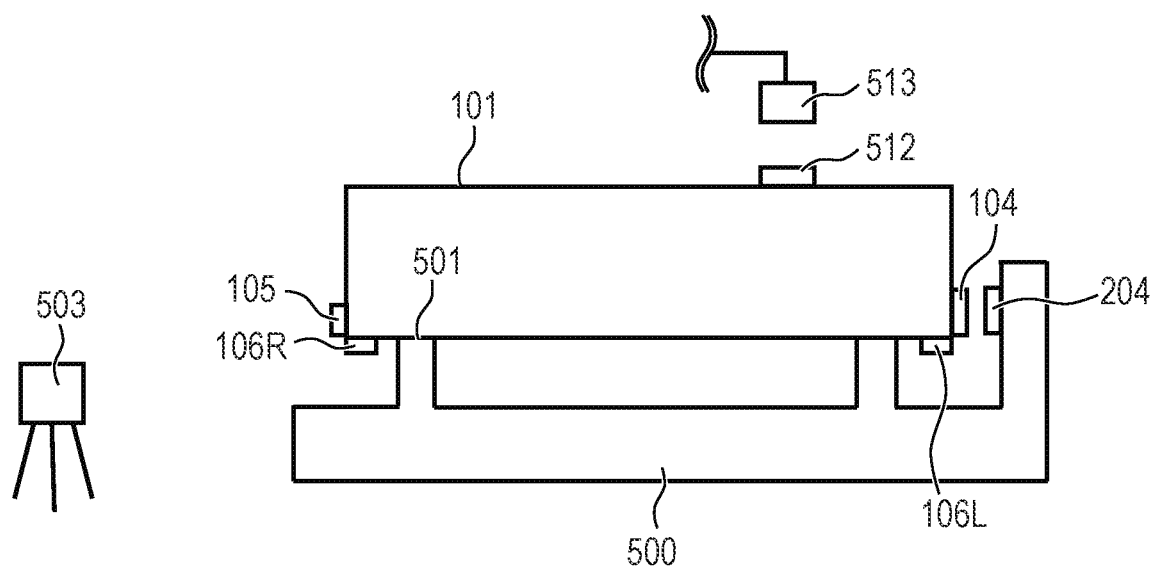
FIG. 5A is a schematic diagram illustrating a method of acquiring a correction value for correcting a movement machine difference of a mover in the transport system according to the first embodiment of the present disclosure.
Figure 5B:
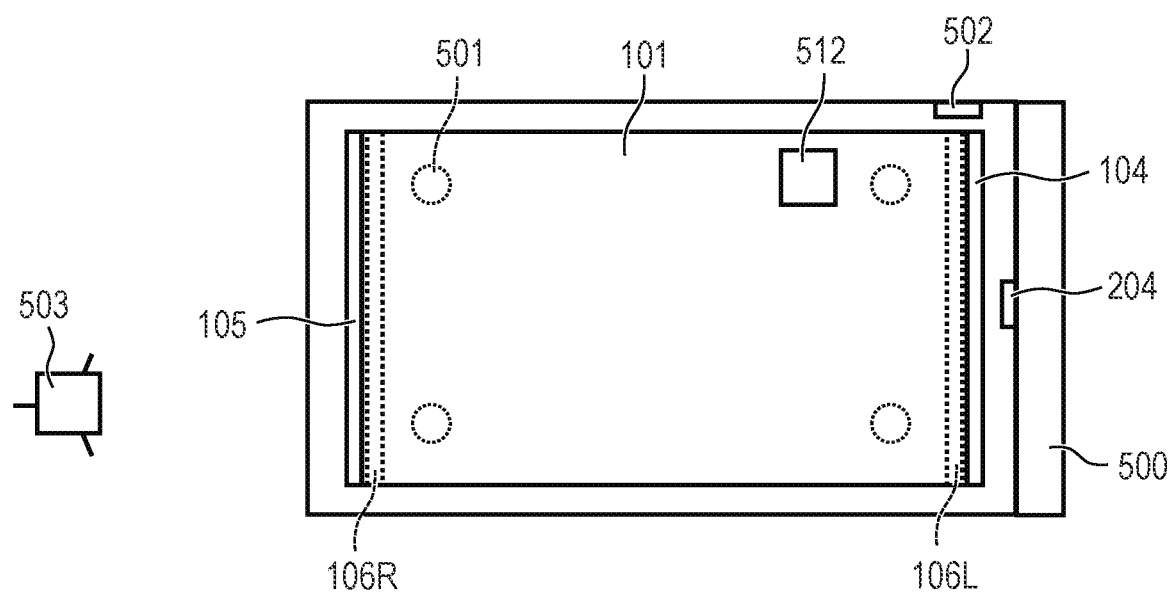
FIG. 5B is a schematic diagram illustrating the method of acquiring the correction value for correcting the movement machine difference in the transport system according to the first embodiment of the present disclosure.

Next, a method of acquiring a correction value for correcting the movement machine difference of the moving devices of the mover 101 according to the present embodiment will be described with reference to FIG. 5A and FIG. 5B. FIG. 5A and FIG. 5B are schematic diagrams illustrating the method of acquiring the correction value for correcting the movement machine difference in the transport system 1 according to the present embodiment, and illustrate a common measuring jig 500 commonly used for a plurality of the movers 101 in acquiring the correction value. FIG. 5A illustrates a common measuring jig 500 viewed in the −X direction. FIG. 5B illustrates a common measuring jig 500 viewed in the −Z direction.

The common measuring jig 500 has a linear encoder 204 similar to that of the stator 201 and a laser displacement meter 502 as a distance measuring means. The linear encoder 204 is mounted on a common measuring jig 500 so that a linear scale 104 of the mover 101 installed on the common measuring jig 500 can be read. The laser displacement meter 502 is installed on a common measuring jig 500 so as to detect the position of the mover 101 in the X direction installed on the common measuring jig 500. The common measuring jig 500 is used to acquire machine difference information which is information on a movement machine difference of the mover 101 for each of the plurality of movers 101. The machine difference of the mover 101 for which the machine difference information is acquired includes the machine difference in each of the X, Y and Z directions.

In the common measuring jig 500, by reading the linear scale 104 of the mover 101 by the linear encoder 204, the position in the X direction of the mover 101 installed in the common measuring jig 500 can be detected. The position in the X direction of the mover 101, which is also installed in the common measuring jig 500, can be detected by measurement using the laser displacement meter 502.

The mover 101 can be identified by reading the RFID tag 512 of the mover 101 installed in the common measuring jig 500 by using the RFID reader 513.

The mover 101 is installed in the common measuring jig 500 so as to simulate the levitation state of the mover 101. In this case, the mover 101 may be supported at the Bessel points 501, or an abutment (not illustrated) may be used as a reference. In the common measuring jig 500, it is important to perform a common installation with good reproduction for the plurality of movers 101.

Here, among the Z-targets 106 of the mover 101, the Z-target 106 arranged on the +Y direction side, which is the right side toward the +X direction that is the advancing direction, is defined as a Z-target 106R. Among the Z-targets 106 of the mover 101, the Z-target 106 arranged on the −Y direction side, which is the left side toward the +X direction that is the advancing direction, is defined as a Z-target 106L.

When acquiring the correction value for correcting the movement machine difference, the mover 101 installed in the common measuring jig 500 is measured by a three-dimensional measuring machine 503 and the laser displacement meter 502. Specifically, the three-dimensional measuring machine 503 measures, along the X direction, the position of the Y-target 105 in the Y direction, the position of the Z-target 106R in the Z direction, and the position of the Z-target 106L in the Z direction. In the measurement, in order to reduce the amount of correction data, measurement may be performed in increments of 1 mm in the X direction, for example. The position of the mover 101 in the X direction is measured by the laser displacement meter 502.

Similarly, with respect to the plurality of movers 101, the position in the Y direction of the Y-target 105, the position in the Z direction of the Z-target 106R and the position in the Z direction of the Z-target 106L are measured along the X direction by the three-dimensional measuring machine 503. Similarly, the positions of the plurality of 101 movers 101 in the X direction are measured by the laser displacement meter 502.

FIG. 6 shows an example of data measured as described above for the Y-target 105, the Z-target 106R, and the Z-target 106L of the mover 101.

In FIG. 6, the upper part illustrates the Y-target 105, the Z-target 106R and the Z-target 106L to be measured, and the lower part shows a graph of the measured data. In the graph shown in the lower part, the horizontal axis indicates the position of the X-axis of the measurement point. The vertical axis indicates, as an error Err, a value obtained by subtracting the measured value from the design value when the mover 101 is installed in the common measuring jig 500. In the graph, Err105 represents the error Err for the Y-target 105, Err106R represents the error Err for the Z-target 106R, and Err106L represents the error Err for the Z-target 106L.

The error Err is a deviation of the target surface of each target read by the sensor from the design value. That is, when the Y-sensor 205 reads the Y-target 105, Err105 becomes a reading error unique to each mover 101. When the Z-sensor 206 reads the Z-target 106R, Err106R becomes a reading error unique to each mover 101. When the Z-sensor 206 reads the Z-target 106L, Err106L becomes a reading error unique to each mover 101.

The reading error of the Y-sensor 205 and the reading error of the Z-sensor 206 become movement machine differences in the attitude of each mover 101 at the time of levitation. Hereinafter, the reading error of the Y-sensor 205 is denoted as Cy, and the reading error of the Z-sensor 206 is denoted as Cz. The reading error Cy is the movement machine difference of the mover 101 in the Y direction. The reading error Cz is the movement machine difference of mover 101 in the Z direction. The reading errors Cy and Cz are used as correction values for correcting the movement machine difference of the mover 101 in the transport control of the mover 101.

Note that when the measured data is used as the correction value, data between the measurement points can be interpolated from a plurality of measurement points by using a method such as Lagrange interpolation.

Figure 7:
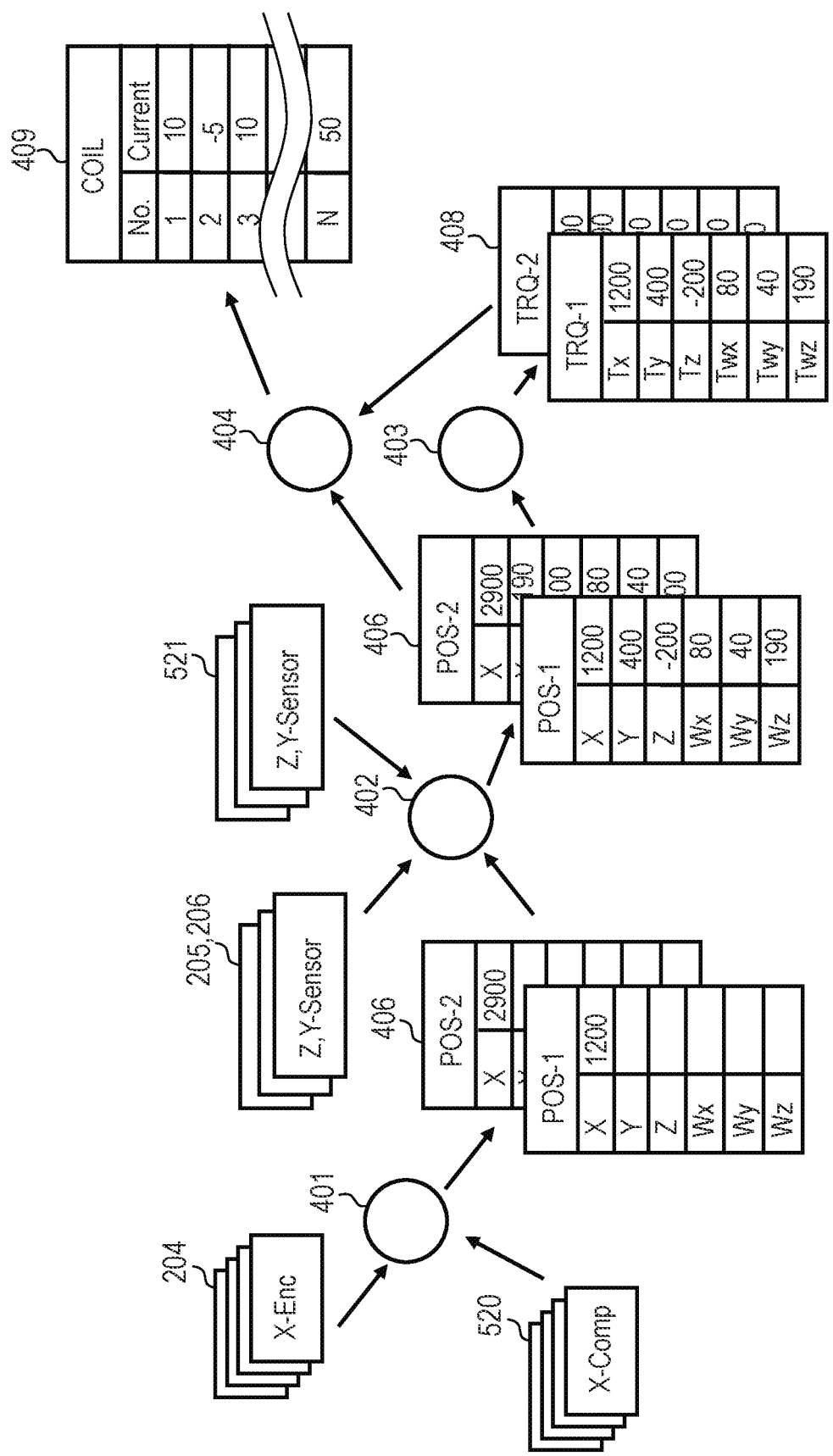
FIG. 7 is a schematic diagram illustrating an attitude control method of the mover in the transport system according to the first embodiment of the present disclosure.

These reading errors Cy and Cz are associated with the individual ID of the mover 101 registered in the RFID tag 512 by the integration controller 301, and are stored in a storage unit such as a semiconductor storage device, a magnetic storage device or the like as machine difference information 521 of the sensor (see FIG. 7). Note that the reading errors Cy and Cz may be stored in an external storage device which can be referenced by the integration controller 301.

On the other hand, the machine difference Cx of the position of the mover 101 in the X direction can be calculated by the following Equation (X1) based on the measurement result by the laser displacement meter 502.

$$Cx = (\text{Ref\_}Lx - Lx) - (\text{Ref\_}Ex - Ex) \qquad \text{Equation (X1)}$$

Herein, Ex, Lx, Ref_Lx, and Ref_Ex represent the following, respectively.

Ex: the measured value of the linear encoder 204 mounted on the common measuring jig 500

Lx: the measured value of the laser displacement meter 502

Ref_Lx: the design value of the position in the X direction from the laser displacement meter 502 to the mover 101

Ref_Ex: the design value of the attached position of the linear encoder 204

Thus, the machine difference Cx which is the movement machine difference of the mover 101 in the X direction is acquired. This machine difference Cx in the position in the X direction is associated with the individual ID of the mover 101 registered in the RFID tag 512 by the integration controller 301, and is stored as difference information 520 (see FIG. 7) in the X direction in a storage unit such as a semiconductor storage device, a magnetic storage device or the like. Note that the machine difference Cx may be stored in an external storage device that can be referenced by the integration controller 301.

Hereinafter, the attitude control method of the mover 101 performed by the integration controller 301 will be described below with reference to FIG. 7. FIG. 7 is a schematic diagram illustrating the attitude control method of the mover 101 in the transport system 1 according to the present embodiment. FIG. 7 illustrates the overview of the attitude control method of the mover 101 by mainly focusing on the data flow. The integration controller 301 performs a process using a mover position calculation function 401, a mover attitude calculation function 402, a mover attitude control function 403, and a coil current calculation function 404 as described below. Accordingly, the integration controller 301 controls transportation of the mover 101 while controlling the attitude of the mover 101 in six axes. Note that, instead of the integration controller 301, the coil controller 302 can perform the same process as the integration controller 301.

First, the mover position calculation function 401 calculates the number and position of the movers 101 on the stator 201 constituting the transport path from the measured values from the plurality of linear encoders 204, information on the attached positions thereof, and the machine difference information 520 of the movers 101 in the X direction. At this time, the mover position calculation function 401 can correct the movement machine difference for each of the movers 101 by using the machine difference information 520 in the X direction stored in association with the individual ID registered in the RFID tag 512 of the mover 101.

According to the above calculation, the mover position calculation function 401 updates the mover position information (X) and the number of units information in mover information 406, which is information about the mover 101. The mover position information (X) indicates the position of the mover 101 in the X direction that is the transport direction of the mover 101 on the stator 201. The mover information 406 is prepared for each mover 101 on the stator 201 as indicated by POS-1, POS-2, . . . in FIG. 7, for example.

Next, the mover attitude calculation function 402 specifies the Y-sensor 205 and the Z-sensor 206 capable of measuring each mover 101 from the mover position information (X) in the mover information 406 updated by the mover position calculation function 401.

Next, the mover attitude calculation function 402 calculates attitude information (Y, Z, Wx, Wy, Wz) which is information on the attitude of each mover 101, and updates the mover information 406. The mover attitude calculation function 402 calculates an attitude (Y, Z, Wx, Wy, Wz) based on the values outputted from the specified Y-sensor 205 and Z-sensor 206 and the machine difference information 521 of the sensors of the Y-target 105, the Z-target 106R and the Z-target 106L. At this time, the mover attitude calculation function 402 can correct the machine difference of the individual mover 101 by using the machine difference information 521 of the sensors stored in association with the individual ID registered in the RFID tag 512 of the mover 101. The mover information 406 updated by the mover attitude calculation function 402 includes the mover position information (X) and the attitude information (Y, Z, Wx, Wy, Wz).

Next, the mover attitude control function 403 calculates the application force information 408 for each mover 101 from the current mover information 406 including the mover position information (X) and the attitude information (Y, Z, Wx, Wy, Wz) and the attitude target value. The application force information 408 is information relating to the magnitude of the force to be applied to each mover 101. The application force information 408 includes information on the three-axis components of force (Tx, Ty, Tz) of the force T to be applied and the three-axis components of torque (Twx, Twy, Twz) of the force T. The application force information 408 is prepared for each mover 101 on the stator 201 as indicated as TRQ-1, TRQ-2, . . . in FIG. 7, for example.

Herein, Tx, Ty, and Tz, which are three-axis components of force, are an X direction component, a Y direction component, and a Z direction component of force, respectively. Further, Twx, Twy, and Twz, which are three-axis components of torque, are a component around the X-axis, a component around the Y-axis, and a component around the Z-axis of torque, respectively. The transport system 1 according to the present embodiment controls transportation of the mover 101 while controlling the attitude of the mover 101 in six axes by controlling these six-axis components (Tx, Ty, Tz, Twx, Twy, Twz) of the force T.

Next, the coil current calculation function 404 determines a current instruction value 409 applied to respective coils 202, 207, and 208 based on the application force information 408 and the mover information 406.

In such a way, the integration controller 301 determines the current instruction value 409 by performing a process using the mover position calculation function 401, the mover attitude calculation function 402, the mover attitude control function 403, and the coil current calculation function 404. The integration controller 301 transmits the determined current instruction value 409 to the coil controller 302.

Figure 8:
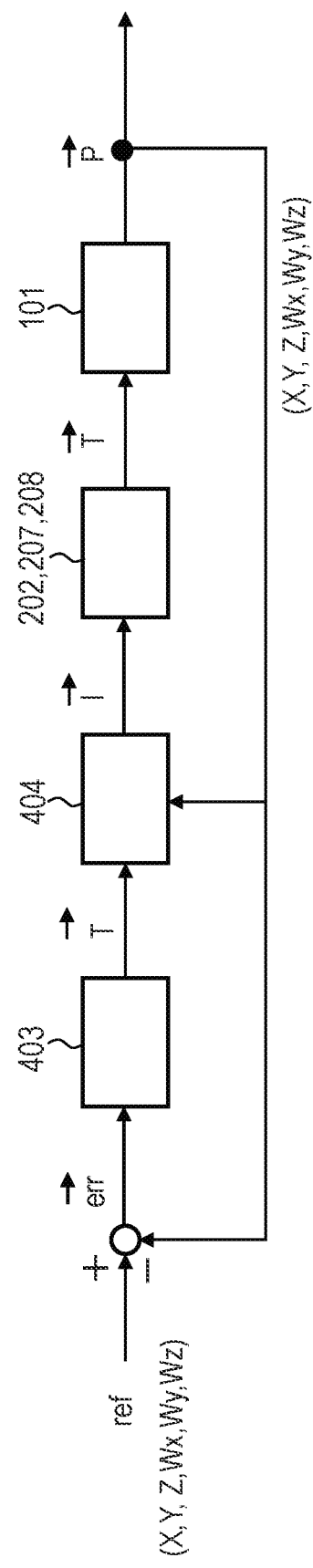
FIG. 8 is a schematic diagram illustrating an example of a control block used for controlling the position and the attitude of the mover in the transport system according to the first embodiment of the present disclosure.

Control of the position and the attitude of the mover 101 will be further described in detail with reference to FIG. 8. FIG. 8 is a schematic diagram illustrating an example of a control block used for controlling the position and the attitude of the mover 101.

In FIG. 8, the symbol P denotes the position and the attitude (also referred to as a position and attitude or a state) of the mover 101 and has components (X, Y, Z, Wx, Wy, Wz). The symbol ref denotes a target value of (X, Y, Z, Wx, Wy, Wz). The symbol err denotes a deviation between the target value ref and the position and the attitude P.

The mover attitude control function 403 calculates force T to be applied to the mover 101 for achieving the target value ref based on the magnitude of the deviation err, the change of the deviation err, an accumulation value of the deviation err, or the like.

The coil current calculation function 404 calculates coil current I to be applied to the coils 202, 207, and 208 for applying the force T to the mover 101 based on the force T to be applied and the position and the attitude P. The coil current I calculated in such a way is applied to the coils 202, 207, and 208, and thereby the force T works on the mover 101, and the position and the attitude P changes to the target value ref.

By configuring the control block in such a way, it is possible to control the position and the attitude P of the mover 101 to a desired target value ref.

Figure 9A:
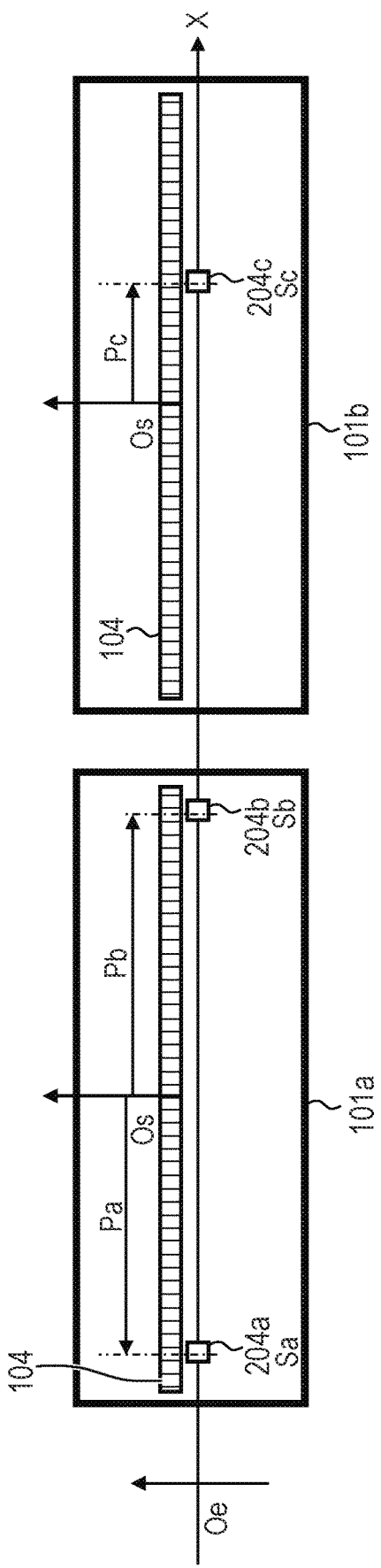
FIG. 9A is a schematic diagram illustrating processing by a mover position calculation function in the transport system according to the first embodiment of the present disclosure.
Figure 9B:
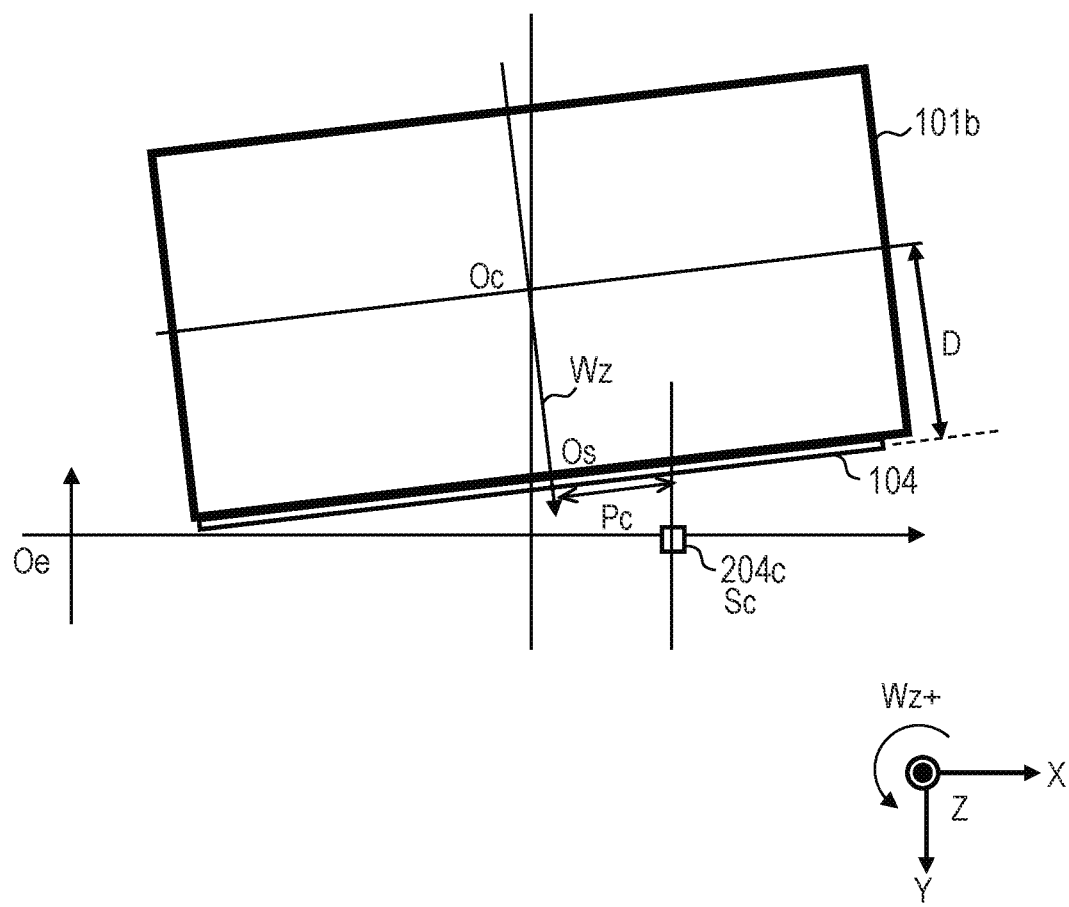
FIG. 9B is a schematic diagram illustrating the processing by the mover position calculation function in the transport system according to the first embodiment of the present disclosure.

The process in accordance with the mover position calculation function 401 will now be described with reference to FIG. 9A and FIG. 9B. FIG. 9A and FIG. 9B are schematic diagrams illustrating the process in accordance with the mover position calculation function.

In FIG. 9A, the reference point Oe corresponds to a position reference of the stator 201 to which the linear encoder 204 is attached. Further, the reference point Os corresponds to a position reference of the linear scale 104 attached to the mover 101. FIG. 9A illustrates a case where two movers 101a and 101b are transported as the mover 101, and three linear encoders 204a, 204b, and 204c are arranged as the linear encoder 204. Note that the linear scales 104 are attached to the same positions of respective movers 101a and 101b along the X direction.

For example, the single linear encoder 204c faces the linear scale 104 of the mover 101b illustrated in FIG. 9A. The linear encoder 204c reads the linear scale 104 of the mover 101b and outputs a distance Pc. Further, the position of the linear encoder 204c on the X-axis whose origin is the reference point Oe is Sc. Therefore, the position Pos(101b) of the mover 101b can be calculated by the following Equation (1).

$$Pos(101b)=Sc-Pc \qquad \text{Equation (1)}$$

For example, two linear encoders 204a and 204b face the linear scale 104 of the mover 101a illustrated in FIG. 9A. The linear encoder 204a reads the linear scale 104 of the mover 101a and outputs the distance Pa. Further, the position of the linear encoder 204a on the X-axis whose origin is the reference point Oe is Sa. Therefore, the position Pos(101a) on the X-axis of the mover 101a based on the output of the linear encoder 204a can be calculated by the following Equation (2).

$$Pos(101a)=Sa-Pa \qquad \text{Equation (2)}$$

Further, the linear encoder 204b reads the linear scale 104 of the mover 101a and outputs the distance Pb. Further, the position of the linear encoder 204b on the X-axis whose origin is the reference point Oe is Sb. Therefore, the position Pos(101a)' on the X-axis of the mover 101a based on the output of the linear encoder 204b can be calculated by the following Equation (3).

$$Pos(101a)'=Sb-Pb \qquad \text{Equation (3)}$$

Herein, since respective positions of the linear encoders 204a and 204b have been measured accurately in advance, the difference of two values Pos(101a) and Pos(101a)' is sufficiently small. When the difference of the positions of the mover 101 on the X-axis based on the output of the two linear encoders 204 is sufficiently small in such a way, it can be determined that these two linear encoders 204 are observing the linear scale 104 of the same mover 101.

Note that, when a plurality of linear encoders 204 face the same mover 101, it is possible to uniquely determine the position of the observed mover 101 by calculating the average value of the positions based on the output of the plurality of linear encoders 204 or the like.

Further, the mover 101 may rotate around the Z-axis by a rotation amount Wz. A case where correction of the position of the mover 101 using the displacement of this rotation amount Wz is required will be described with FIG. 9B. FIG. 9B illustrates a case where the linear scale 104 is attached to one of the side faces in the Y direction of the mover 101b. The position Os is the origin of the linear scale 104, and the position Oc is the origin of the mover 101b. When the distance from the center Oc of the mover 101 to the linear scale 104 is D, more accurate position Pos(101b) of the mover 101b can be obtained by calculating the position Pos(101b) of the mover 101b by using the following Equation (1b).

$$Pos(101b)=Sc-Pc-Wz*D \qquad \text{Equation (1b)}$$

Further, in consideration of the machine difference Cx (101b) which is the movement machine difference in the position of the mover 101b in the X direction, the position Pos (101b) of the mover 101b can be calculated by using the following Equation (1c) to obtain a more accurate position of the mover 101b.

$$Pos(101b)=Sc-Pc-Wz*D+Cx(101b) \qquad \text{Equation (1c)}$$

The mover position calculation function 401 calculates and determines the position X in the X direction of the mover 101 as the mover position information based on the output of the linear encoder 204 as described above. When calculating the position X, the mover position calculation function 401 can correct the movement machine differences of the respective movers 101 by taking into account the machine differences Cx of the positions of the movers 101 in the X direction.

Next, the process by using the mover attitude calculation function 402 will be described with reference to FIG. 10, FIG. 11A and FIG. 11B.

Figure 10:
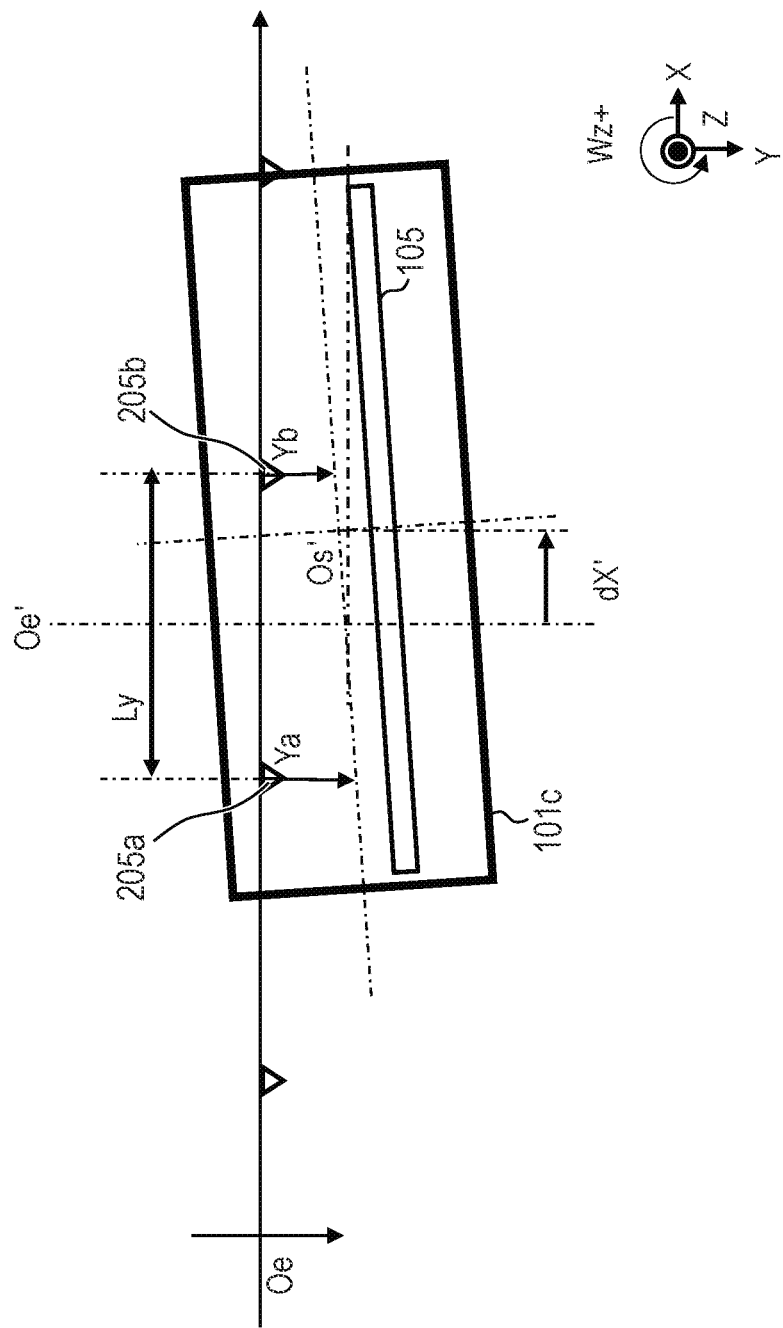
FIG. 10 is a schematic diagram illustrating processing by a mover attitude calculation function in the transport system according to the first embodiment of the present disclosure.

FIG. 10 illustrates a case where a mover 101c is transported as the mover 101, and Y-sensors 205a and 205b are arranged as the Y-sensor 205. The two Y-sensors 205a and 205b face the Y-target 105 of the mover 101c illustrated in FIG. 10. The rotation amount Wz around the Z-axis of the mover 101c is calculated by the following Equation (4), where the values of relative distances output by the two Y-sensors 205a and 205b are Ya and Yb, respectively, and the spacing between the Y-sensors 205a and 205b is Ly.

$$Wz=(Ya-Yb)/Ly \qquad \text{Equation (4)}$$

Herein, the reading errors Cy of the Y-sensors 205a and 205b are represented by reading errors Cy(205a, 101c) and Cy(205b, 101c), respectively. Then, the values Ya and Yb of the outputs of the Y-sensors 205a and 205b can be corrected in consideration of the reading errors Cy(205a, 101c) and Cy(205b, 101c), respectively. The output values Ya' and Yb' of the Y-sensors 205a and 205b after correction taking into account the reading errors Cy(205a, 101c) and Cy(205b, 101c), respectively, are represented by the following Equations (4a) and (4b), respectively.

$$Ya'=Ya+Cy(205a,101c) \qquad \text{Equation (4a)}$$

$$Yb'=Yb+Cy(205b,101c) \qquad \text{Equation (4b)}$$

The corrected rotation amount Wz' of the mover 101c around the Z-axis in consideration of the reading errors Cy(205a, 101c) and Cy (205b, 101c) of the Y-sensors 205a and 205b is calculated by the following Equation (4c).

$$Wz'=(Ya'-Yb')/Ly \qquad \text{Equation (4c)}$$

Note that, depending on the position of the mover 101, three or more Y-sensors 205 may face the Y-target 105 of the mover 101. In this case, the inclination of the Y-target 105, that is, the rotation amount Wz' around the Z-axis can be calculated using the least squares method or the like.

Figure 11A:
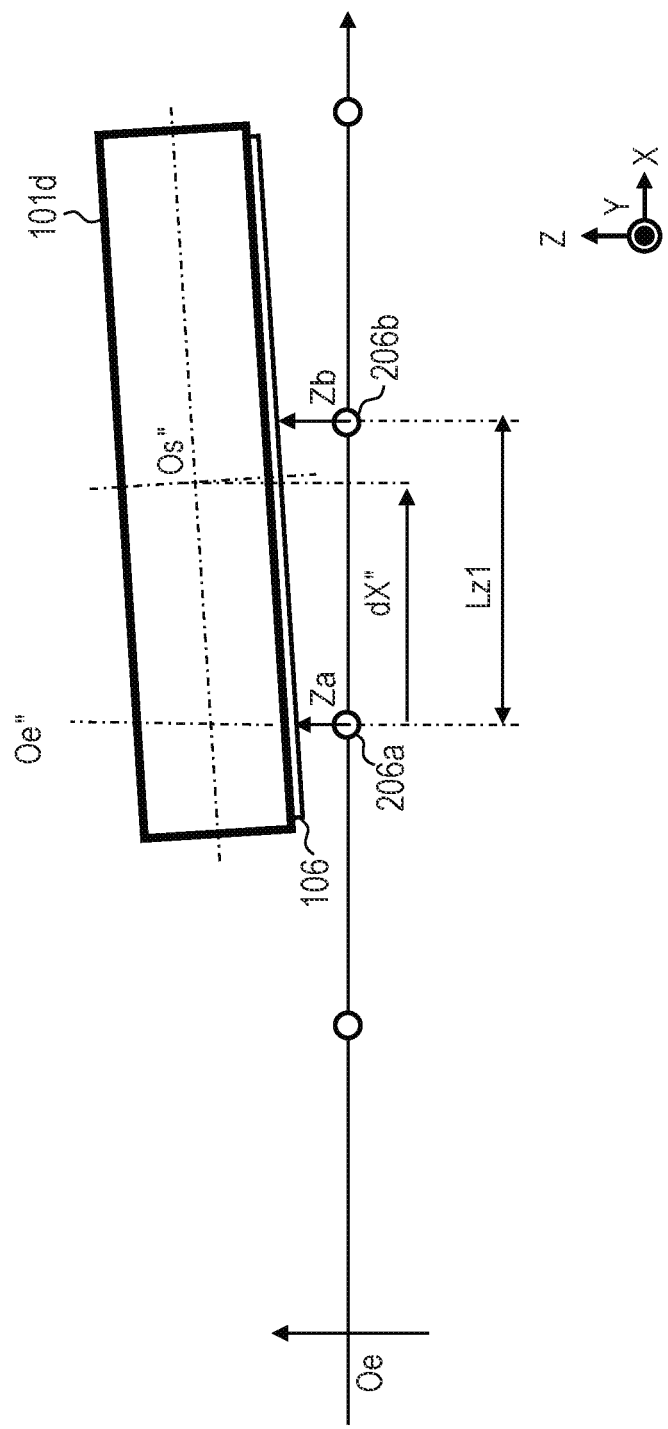
FIG. 11A is a schematic diagram illustrating the processing by the mover attitude calculation function in the transport system according to the first embodiment of the present disclosure.
Figure 11B:
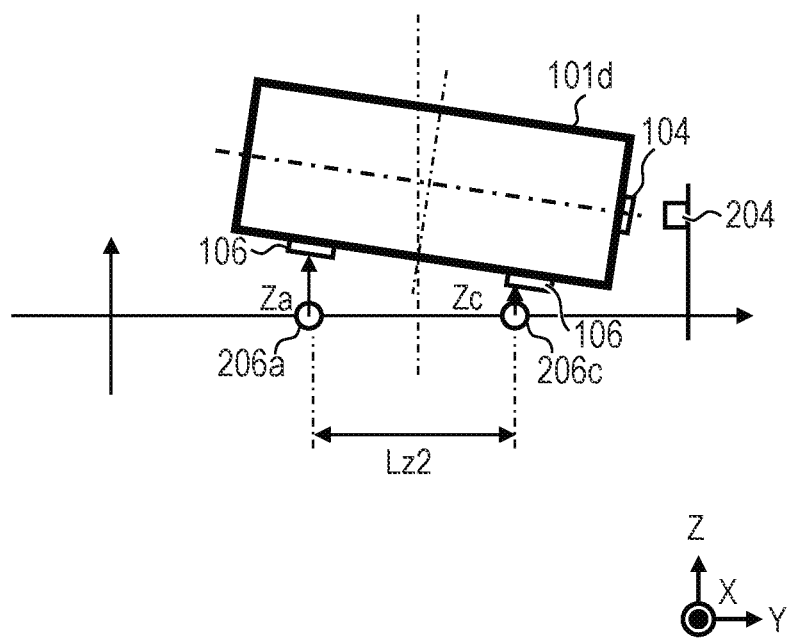
FIG. 11B is a schematic diagram illustrating the processing by the mover attitude calculation function in the transport system according to the first embodiment of the present disclosure.

FIG. 11A and FIG. 11B illustrate a case where a mover 101d is transported as the mover 101, and Z-sensors 206a, 206b, and 206c are arranged as the Z-sensor 206. The three Z-sensors 206a, 206b, and 206c face the Z-target 106 of the mover 101d illustrated in FIG. 11A and FIG. 11B. Herein, the values of relative distances output by the three Z-sensors 206a, 206b, and 206c are Za, Zb, and Zc, respectively. Further, the distance between sensors in the X direction, that is, the distance between the Z-sensors 206a and 206b is Lz1. Further, the distance between sensors in the Y direction, that is, the distance between the Z-sensors 206a and 206c is Lz2. Then, the rotation amount Wy around the Y-axis and the rotation amount Wx around the X-axis can be calculated by the following Equations (5a) and (5b), respectively.

$$Wy=(Zb-Za)/Lz1 \qquad \text{Equation (5a)}$$

$$Wx=(Zc-Za)/Lz2 \qquad \text{Equation (5b)}$$

The reading errors Cz of the Z-sensors 206a, 206b, and 206c are represented by Cz(206a, 101d), Cz(206b, 101d), and Cz(206c, 101d), respectively. Then, the values Za, Zb, and Zc of the outputs of the Z-sensors 206a, 206b, and 206c can be corrected in consideration of the reading errors Cz(206a, 101d), Cz(206b, 101d), and Cz(206c, 101d), respectively. The corrected output values Za', Zb', and Zc' of the Z-sensors 206a, 206b, and 206c considering the reading errors Cz(206a, 101d), Cz(206b, 101d), and Cz(206c, 101d) are represented by the following Equations (5c), (5d), and (5e), respectively.

$$Za'=Za+Cz(206a,101d) \qquad \text{Equation (5c)}$$

$$Zb'=Zb+Cz(206b,101d) \qquad \text{Equation (5d)}$$

$$Zc'=Zc+Cz(206c,101d) \qquad \text{Equation (5e)}$$

The corrected rotation amount Wy' of the mover 101d around the Y-axis in consideration of the reading errors Cz(206a, 101d) and Cz(206b, 101d) of the Z-sensors 206a and 206b can be calculated by the following Equation (5f).

$$Wy'=(Zb'-Za')/Lz1 \qquad \text{Equation (5f)}$$

The corrected rotation amount Wx' of the mover 101d around the X-axis in consideration of the reading errors Cz(206a, 101d) and Cz(206c, 101d) of the Z-sensors 206a and 206c can be calculated by the following Equation (5g).

$$Wx'=(Zc'-Za')/Lz2 \qquad \text{Equation (5g)}$$

The mover attitude calculation function 402 can calculate the rotation amounts Wx', Wy', and Wz' around the respective axes as the attitude information of the mover 101 by performing correction in consideration of the reading errors Cy of the Y-sensors 205 and the reading errors Cz of the Z-sensors 206 as described above.

Further, with the mover attitude calculation function 402, it is possible to calculate the position Y in the Y direction and the position Z in the Z direction of the mover 101 as attitude information on the mover 101 as follows.

First, calculation of the position Y in the Y direction of the mover 101 will be described with reference to FIG. 10. In FIG. 10, two Y-sensors 205 faced by the mover 101c are Y-sensors 205a and 205b, respectively. Further, the measured values of the Y-sensors 205a and 205b are Ya and Yb, respectively. Further, the middle point of the position of the Y-sensor 205a and the position of the Y-sensor 205b is denoted as Oe'. Furthermore, the position of the mover 101c obtained by Equations (1) to (3) is denoted as Os', and the distance from Oe' to Os' is denoted as dX'. At this time, the position Y in the Y direction of the mover 101c can be calculated by approximate calculation with the following Equation (6).

$$Y=(Ya+Yb)/2-Wz*dX' \qquad \text{Equation (6)}$$

The position Y of the mover 101c in the Y direction can be corrected in consideration of the reading errors Cy(205a, 101c) and Cy(205b, 101c) of the Y-sensors 205a and 205b. The position Y' of the mover 101c in the Y direction corrected in consideration of the reading errors Cy(205a, 101c) and Cy (205b, 101c) can be approximately calculated by the following Equation (6a).

$$Y'=(Ya'+Yb')/2-Wz'*dX' \qquad \text{Equation (6a)}$$

Next, calculation of the position Z in the Z direction of the mover 101 will be described with reference to FIG. 11A and FIG. 11B. Three Z-sensors 206 faced by the mover 101d are Z-sensors 206a, 206b, and 206c, respectively. Further, the measured values of the Z-sensors 206a, 206b, and 206c are Za Zb, and Zc, respectively. Further, the X-coordinate of the Z sensor 206a and the X-coordinate of the Z-sensor 206c are the same. Further, the linear encoder 204 is located in the middle position between the Z-sensor 206a and the Z-sensor 206c. Further, the position X of the Z-sensor 206a and the Z-sensor 206c is denoted as Oe". Furthermore, the distance from Oe" to the center Os" of the mover 101d is denoted as dX". At this time, the position Z in the Z direction of the mover 101d can be calculated by approximate calculation with the following Equation (7).

$$Z=(Za+Zb)/2+Wy*dX'' \qquad \text{Equation (7)}$$

The position Z of the mover 101d in the Z direction can be corrected in consideration of the reading errors Cz(206a, 101d), Cz(206b, 101d), and Cz(206c, 101d) of the Z-sensors 206a, 206b, and 206c. The position Z' of the mover 101d in the Z direction corrected in consideration of the reading errors Cz(206a, 101d), Cz (206b, 101d) and Cz(206c, 101d) can be approximately calculated by the following Equation (7a).

$$Z'=(Za'+Zb')/2+Wy'*dX'' \qquad \text{Equation (7a)}$$

Note that, when both the rotation amounts of Wz and Wy are large for the position Y and the position Z, calculation can be performed at higher approximation accuracy.

Thus, the integration controller 301 performs processing using the mover position calculation function 401 and the mover attitude calculation function 402 to function as an acquisition unit for acquiring the position and the attitude of the mover 101. When acquiring the position and the attitude of the mover 101, the integration controller 301 can correct the position and attitude of the mover 101 in consideration of the machine difference Cx of the position of the mover 101 in the X direction, the reading error Cy of the Y-sensor 205, and the reading error Cz of the Z-sensor 206.

Next, a method of determining current values to be applied to the coils 202, 207, and 208 used for applying desired force T to the mover 101 will be described. The force T applied to the mover 101 includes Tx, Ty, and Tz, which are three-axis components of force, and Twx, Twy, and Twz, which are three-axis components of torque, as described above. The integration controller 301 that performs a process using the coil current calculation function 404 can determine current values to be applied to the coils 202, 207, and 208 in accordance with the method of determining current values described below.

Note that, out of the force components and the torque components applied by the coils 202, 207, and 208, influence from one force component or torque component caused to the other force components or torque components may be sufficiently negligible for some cases. Specifically, the force and torque applied by the coils 202, 207, and 208 is formed of the force in X direction applied by the coil 207, the force in the Y direction and the torque in the Wz direction applied by the coil 208, and the force in the Z direction, the torque in the Wx direction, and the torque in the Wy direction applied by the coil 202. The force in the Y direction and the torque in the Wz direction applied by the coil 208 work in the horizontal direction. The force in the Z direction, the torque in the Wx direction, and the torque in the Wy direction applied by the coil 202 work in the levitation direction. When the influence is sufficiently negligible, the current values can be calculated taking into consideration of only the force in the X direction for the coil 207, the force in the Y direction and the torque in the Wz direction for the coil 208, and the force in the Z direction, the torque in the Wx direction, and the torque in the Wy direction for the coil 202. A case where the influence can be sufficiently neglected will be described below.

First, current applied to each coil 202 for applying the force component Tz in the Z direction, the torque component Twx in the Wx direction, and the torque component Twy in the Wy direction to the mover 101 will be described with reference to FIG. 12 to FIG. 14B.

Figure 12:
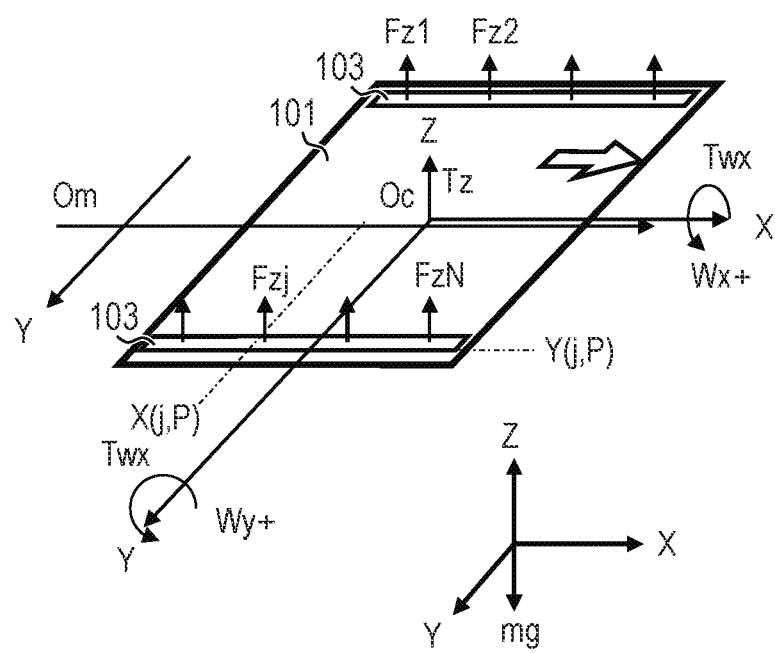
FIG. 12 is a schematic diagram illustrating a relationship between a force acting on a yoke plate attached to the mover and a force component and a torque component acting on the mover in the transport system according to the first embodiment of the present disclosure.

FIG. 12 is a schematic diagram illustrating a relationship between the force working on the yoke plate 103 attached to the mover 101 and the force component Tz and the torque components Twx and Twy working on the mover 101.

In FIG. 12, Fzj denotes force applied to the yoke plate 103 by the j-th coil 202. Note that j is an integer satisfying 1≤j≤N, where the number N of installed coils 202 is an integer greater than or equal to two. The torque applied by each force Fzj contributes to the torque components Twx and Twy. The torque applied by each force Fzj is determined in accordance with the force Fzj and the distance between the point of action and the center Oc of the mover 101.

Figure 13:
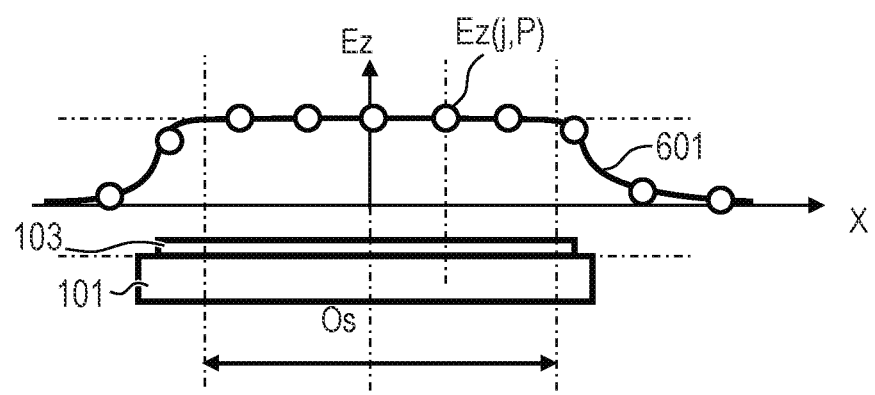
FIG. 13 is a graph schematically illustrating a thrust constant profile in the Z-direction in the transport system according to the first embodiment of the present disclosure.

FIG. 13 is a graph schematically illustrating a thrust constant profile 601 in the Z direction. The thrust constant profile 601 schematically illustrates attractive force working on the yoke plate 103 when unit current is applied to the coil 202 used for levitation that faces the yoke plate 103. The magnitude of the attractive force continuously changes with respect to the motion in the X direction.

Figure 14A:
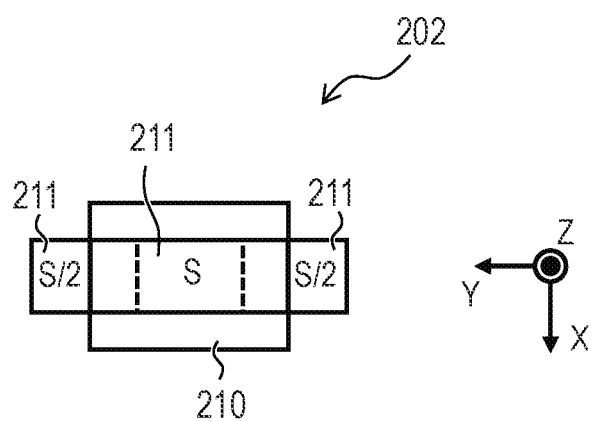
FIG. 14A is a schematic diagram illustrating a stator coil in the transport system according to the first embodiment of the present disclosure.
Figure 14B:
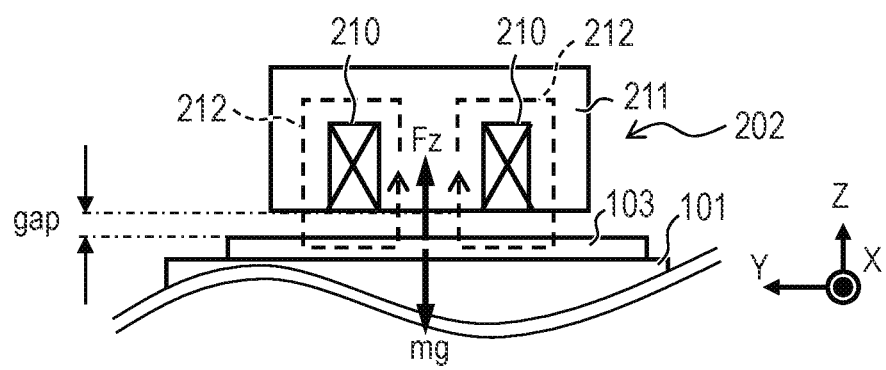
FIG. 14B is a schematic diagram illustrating the stator coil in the transport system according to the first embodiment of the present disclosure.

An example of the configuration of the coil 202 will be described with reference to FIG. 14A and FIG. 14B. FIG. 14A and FIG. 14B are schematic diagrams illustrating the coil 202. FIG. 14A is a diagram of the coil 202 when viewed from the Z direction, and FIG. 14B is a diagram of the coil 202 when viewed from the X direction.

As illustrated in FIG. 14A and FIG. 14B, the coil 202 has a winding 210 and a core 211. Current is applied to the winding 210 by the current controller 313. In response to application of current to the winding 210, a magnetic path 212 that is a path of a magnetic flux is formed. Attractive force works between the coil 202 and the yoke plate 103 due to the magnetic flux in the magnetic path 212 formed in such a way.

Figure 15:
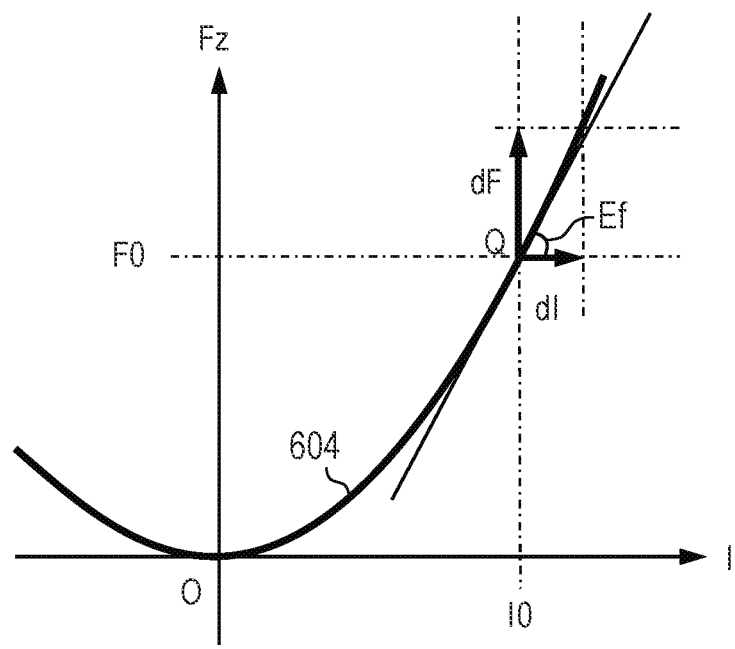
FIG. 15 is a graph schematically illustrating a relationship between the amount of current applied to the coil and the magnitude of an attractive force acting between the coil and the yoke plate in the transport system according to the first embodiment of the present disclosure.

The relationship between the current applied to the coil 202 and the magnitude of the attractive force working between the coil 202 and the yoke plate 103 will be described in more detail with reference to FIG. 14A to FIG. 15. FIG. 15 is a graph schematically illustrating the relationship between the current applied to the coil 202 and the magnitude of the attractive force working between the coil 202 and the yoke plate 103. In the graph illustrated in FIG. 15, the horizontal axis represents the current amount I applied to the coil 202, and the vertical axis represents the magnitude of attractive force Fz working between the coil 202 and the yoke plate 103. The graph illustrated in FIG. 15 indicates an attractive force profile 604 indicating the magnitude of attractive force Fz to the current amount I.

When the spacing in the Z direction between the coil 202 and the yoke plate 103 is constant, the attractive force Fz is approximately proportional to the square of the current amount I. Herein, in the graph illustrated in FIG. 15, F0 represents an average magnitude of force working on each coil 202 required for compensating the gravity mg working on the mover 101.

Herein, numeric values and symbols are set as follows.
Bottom area of the core 211 of one coil 202: S=0.01 [m$^2$]
A part of the mass of the mover 101 compensated by one coil 202: F0=100 [N] (around 10 [kg])
Vacuum magnetic permeability: $\mu 0 = 4\pi \times 10^{-7}$
Airgap: gap [m]
Number of turns of the winding 210 of the coil 202: n [turn]
Coil current: I [A]
Magnetic flux density between the core 211 and the yoke plate 103: B [T]

If the magnetic permeability of the core 211 and the yoke plate 103 is sufficiently large relative to the vacuum magnetic permeability, Fz and B can be approximately calculated by the following Equation (8a) and (8b), respectively.

$$Fz = S*B^2/(2*\mu 0) \quad \text{Equation (8a)}$$

$$B = N*I*\mu 0/(2*\text{gap}) \quad \text{Equation (8b)}$$

Herein, when the number of turns is 500 [turn] and the coil current I0 is 1.0 [A], the airgap "gap" can be calculated to be 0.006266 [m] by Equation (8a) and Equation (8b).

Herein, in the attractive force profile 604, a point where I=I0 leading to Fz=F0 is Q. A part around this point Q will be described.

If the "gap" changes in the expansion direction by 0.25 [mm] from 0.006266 [m], it is necessary to generate larger magneto-motive force in the coil 202 in order to compensate the expanding "gap". If the "gap" is 0.006516 [m] and Equations (8a) and (8b) are calculated so as to generate the same Fz, the coil current I is calculated to be 1.0399 [A]. Because of such a level of current value, the variation in the current value of the coil current during transportation of the mover 101 is sufficiently small compared to the coil current I0 that is a reference.

Therefore, around the point Q, the relationship expressed in the following Equation (8c) is met between current dI applied in addition to the current I0 and the magnitude of force dF additionally generated in the Z-axis direction by application of current dI. Note that the relationship expressed by Equation (8c) is not met around the origin O.

$$dF \propto dI \qquad \text{Equation (8c)}$$

Herein, the ratio of dF and dI is defined by the following Equation (8d).

$$dF/dI = Ez \qquad \text{Equation (8d)}$$

In the thrust constant profile 601 illustrated in FIG. 13, Ez(j, P) is indicated. Ez(j, P) has a ratio indicated by Equation (8d). That is, Ez(j, P) represents the ratio of the magnitude of force dF additionally generated in the Z-axis direction to the current Id when the additional current dI is applied to the current I0 being applied on average to the j-th coil 202 when the mover 101 is in the position and attitude P.

Description is provided with reference to FIG. 12 in accordance with the denotation described above, where j is the index identifying the coil 202. In the following, for simplified illustration, additional force dFzj in the Z direction is simply denoted as Fzj, and the additional current dIj is denoted as Ij.

The additional force Fzj generated in the Z direction by the j-th coil 202 is expressed by the following Equation (9a), where Ij represents additional current applied to the j-th coil 202.

$$Fzj = Ez(j,P)*Ij \qquad \text{Equation (9a)}$$

Furthermore, X(j, P) is defined as the relative position in the X direction of the j-th coil 202 when viewed from the origin Oc of the mover 101, and Y(j, P) is defined as the relative position in the Y direction of the j-th coil 202 when viewed from the origin Oc of the mover 101. Then, the force component Tz in the Z direction, the torque component Twx in the Wx direction, and the torque component Twy in the Wy direction are expressed by the following Equations (9b), (9c), and (9d), respectively.

$$Tz = \Sigma(Ez(j,P)*Ij) \qquad \text{Equation (9b)}$$

$$Twx = \Sigma(-Ez(j,P)*Y(j,P)*Ij) \qquad \text{Equation (9c)}$$

$$Twy = \Sigma(Ez(j,P)*X(j,P)*Ij) \qquad \text{Equation (9d)}$$

If the current Ij satisfying the above Equations (9b), (9c), and (9d) is applied to each coil 202, desired force component and torque component (Tz, Twx, Twy) can be obtained.

The torque contribution matrix M is defined here. The torque contribution matrix M is a matrix indicating the magnitude of contribution to each force component and torque component (Tz, Twx, Twy) when unit current is applied to each of the first to j-th coils 202 when the mover 101 is in the position and attitude P. In such a way, the torque contribution matrix M is used and information related to contribution to each component of the force component and the torque component (Tz, Twx, Twy) caused by unit current applied to each coil 202 is used to determine the current value applied to each coil 202.

In the torque contribution matrix M, the first row is associated with the Z direction, the second row is associated with the Wx direction, and the third row is associated with the Wy direction. Then, respective elements M(1, j), M(2, j), and M(3, j) on the first row on the j-th column, the second row on the j-th column, and the third row on the j-th column of the torque contribution matrix M are expressed by the following Equations (10a), (10b), and (10c), respectively. The torque contribution matrix M is a matrix of three rows by N columns. Note that respective rows of the torque contribution matrix M are linearly independent of each other.

$$M(1,j) = Ez(j,P) \qquad \text{Equation (10a)}$$

$$M(2,j) = -Ez(j,P)*Y(j,P) \qquad \text{Equation (10b)}$$

$$M(3,j) = Ez(j,P)*X(j,P) \qquad \text{Equation (10c)}$$

On the other hand, a column vector whose elements are current amounts I1 to IN to be applied to the first to N-th coils 202 is introduced with a coil current vector Is. The coil current vector Is is a column vector on the N-th row on the first column expressed by the following Equation (10d).

$$Is = Tr(I1, I2, \ldots, Ij, \ldots, IN) \qquad \text{Equation (10d)}$$

The torque vector Tq is defined here as the following Equation (11).

$$Tq = Tr(Tz, Twx, Twy) \qquad \text{Equation (11)}$$

Then, the following Equation (12) is obtained from Equations (9b) to (9d), (10a) to (10d), and (11).

$$Tq = M*Is \qquad \text{Equation (12)}$$

The pseudo current vector K is introduced here. The pseudo current vector K is a column vector having three rows by one column and is a vector satisfying the following Equation (13) when Tr(M) is a transpose matrix of the torque contribution matrix M.

$$Tr(M)*K = Is \qquad \text{Equation (13)}$$

Since it is possible to apply a larger current value to the coil 202 which more contributes to Tz, Twx, and Twy by defining the coil current vector Is as a vector expressed by Equation (13), it is possible to apply current efficiently.

Equation (12) can be transformed into the following Equation (14) by using Equation (13).

$$Tq = M*Tr(M)*K \qquad \text{Equation (14)}$$

In Equation (14), M*Tr(M) is a product of a matrix of three rows by N columns and a matrix of N rows and three columns and thus is a square matrix of three rows by three columns. Further, respective rows of the torque contribution matrix M are linearly independent of each other. Therefore, an inverse matrix can be obtained from M*Tr(M) in any cases. Thus, Equation (14) can be transformed into the following Equation (15).

$$K = Inv(M*Tr(M))*Tq \qquad \text{Equation (15)}$$

The coil current vector Is expressed by the following Equation (16) is finally obtained from Equations (13) and (15). In such a way, the coil current vector Is can be uniquely found.

$$Tr(M)*Inv(M*Tr(M))*Tq = Is \qquad \text{Equation (16)}$$

By calculating the coil current vector Is as described above, it is possible to determine current to be applied to each coil 202. Accordingly, since it is possible to independently apply the force component Tz in Z direction, the torque component Twx in the Wx direction, and the torque component Twy in the Wy direction to the mover 101, it is possible to stabilize the attitude of the mover 101 in the Z direction, the Wx direction, and the Wy direction.

Figure 16:
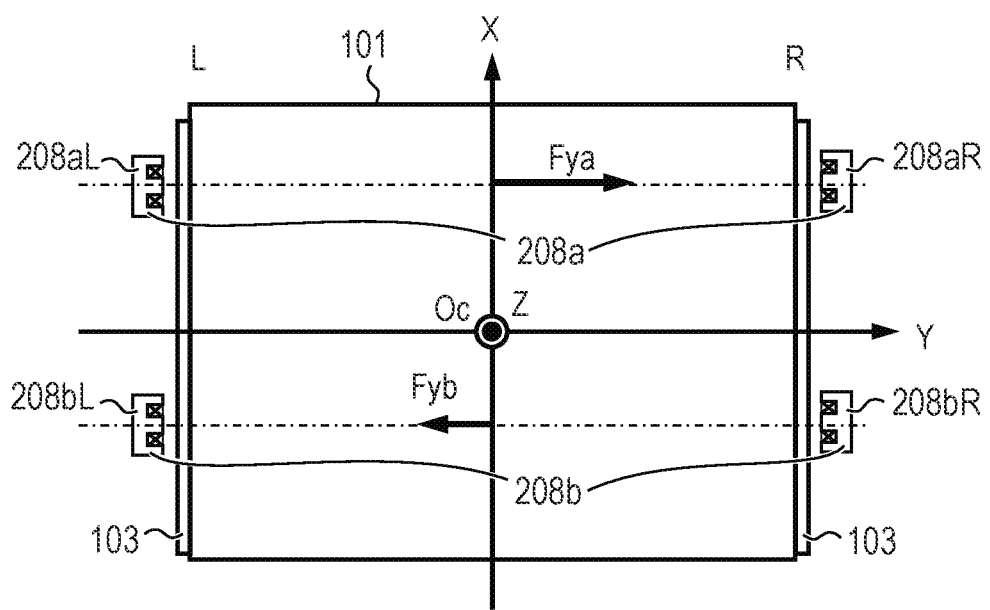
FIG. 16 is a schematic diagram of the mover viewed from top to bottom along the Z-direction in the transport system according to the first embodiment of the present disclosure.
Figure 17:
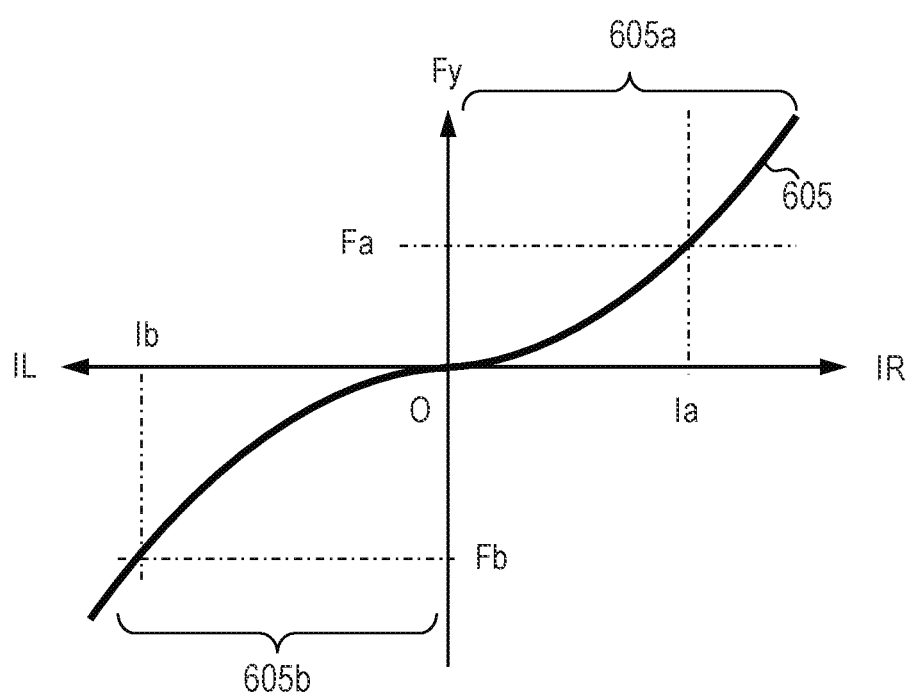
FIG. 17 is a graph schematically illustrating an attractive force profile in the Y-direction in the transport system according to the first embodiment of the present disclosure.

Next, current applied to the coil 208 for applying the force component Ty in the Y direction and the torque component Twz in the Wz direction to the mover 101 will be described with reference to FIG. 16 and FIG. 17. The force component Ty and the torque component Twz work in the horizontal direction, respectively. FIG. 16 is a schematic diagram of the mover 101 when viewed from the top to the bottom in the Z direction. FIG. 17 is a graph schematically illustrating an attractive force profile 605 in the Y direction. In the graph illustrated in FIG. 17, the horizontal axis represents current applied to the coil 208, and the vertical axis represents force working on the mover 101.

Note that, for simplified illustration, FIG. 16 illustrates a case where, as the coils 208 installed on the stator 201, four coils 208aR, 208bR, 208aL, and 208bL face the mover 101. Further, the coil 208aL and the coil 208aR are paired to operate as one coil 208a. Further, the coil 208bL and the coil 208bR are paired to operate as one coil 208b. In such a way, the j-th paired coil 208jR and coil 208jL are paired to operate as one coil 208j.

The attractive force profile 605 illustrated in FIG. 17 indicates the relationship between the level of current IL and IR applied to the j-th pair of coils 208j and the magnitude of the force Fy working on the mover 101. No repulsive force works and only the attractive force works between the coil 208 and the yoke plate 103. Thus, when force is applied in Y+ direction to the mover 101, current is applied to the coil 208jR on the R side in a range 605a of the attractive force profile 605. Further, when force is applied in Y− direction to the mover 101, current is applied to the coil 208jL on the L side in a range 605b of the attractive force profile 605.

For example, when force Fa in the Y+ direction is applied, current Ia can be applied to the coil 208jR on the R side. Further, for example, when force Fb in the Y− direction is applied, current Ib can be applied to the coil 208jL on the L side.

The index j is defined as an index identifying a pair of coils 208. Further, $X(j, P)$ is defined as the relative position in the X direction of the j-th pair of coils 208 when viewed from the origin Oc of the mover 101. Further, force in the Y direction applied by the j-th pair of coils 208 is denoted as Fyj. Then, the force component Ty in the Y direction and the torque component Twz in the Wz direction that correspond to the horizontal direction are expressed by the following Equations (17a) and (17b), respectively.

$$Ty = \Sigma Fyj \quad \text{Equation (17a)}$$

$$Twz = \Sigma(-Fyj * X(j,P)) \quad \text{Equation (17b)}$$

A Y direction force vector Fys having elements of force Fy1, Fy2, . . . , FyN in the Y direction applied by the first to N-th coils 208 is defined here by the following Equation (17c).

$$Fys = Tr(Fy1, Fy2, \ldots, Fyj, \ldots, FyN) \quad \text{Equation (17c)}$$

Furthermore, the torque vector Tq is defined by the following Equation (17d).

$$Tq = Tr(Ty, Twz) \quad \text{Equation (17d)}$$

In the torque contribution matrix M, the first row is associated with the Y direction, and the second row is associated with the Wz direction. Then, respective elements $M(1, j)$ and $M(2, j)$ on the first row on the j-th column and the second row on the j-th column of the torque contribution matrix M are expressed by the following Equations (17e) and (17f), respectively.

$$M(1,j) = 1 \quad \text{Equation (17e)}$$

$$M(2,j) = X(j,P) \quad \text{Equation (17f)}$$

To calculate current to be applied to the coil 208, first, the Y direction force vector Fys satisfying the following Equation (17g) is determined.

$$Tq = M * Fys \quad \text{Equation (17g)}$$

Since Tq is a vector of two rows by one column and M is a matrix of two rows by N columns, there are innumerable combinations of elements of the Y direction force vector Fys satisfying Equation (17g), however, the combination can be calculated uniquely in accordance with the following method.

Herein, the pseudo current vector K of two rows by one column is introduced. The pseudo current vector K is a vector satisfying the following Equation (17h), where Tr(M) is a transpose matrix of the torque contribution matrix M.

$$Tr(M) * K = Fys \quad \text{Equation (17h)}$$

Equation (17g) can be transformed into the following Equation (17i) by using Equation (17h).

$$Tq = M * Tr(M) * K \quad \text{Equation (17i)}$$

The item M*Tr(M) is a product of a matrix of two rows by N columns and a matrix of N rows by two columns and thus is a square matrix of two rows by two columns. Further, respective rows of the torque contribution matrix M are linearly independent of each other. Therefore, an inverse matrix can be obtained from M*Tr(M) in any cases. Thus, Equation (17i) can be transformed into the following Equation (17j).

$$K = Inv(M * Tr(M)) * Tq \quad \text{Equation (17j)}$$

The Y direction force vector Fys expressed by the following Equation (17k) is finally obtained from Equations (17h) and (17j). Accordingly, the Y direction force vector Fys can be uniquely calculated.

$$Tr(M) * Inv(M * Tr(M)) * Tq = Fys \quad \text{Equation (17k)}$$

After the Y direction force vector Fys is obtained, current to be applied to each coil 208 can be calculated by counting backward from the attractive force profile 605 calculated or measured in advance.

As described above, the current to be applied to each coil 208 can be determined. Accordingly, since the force component Ty in the Y direction and the torque component Twz in the Wz direction can be independently applied to the mover 101, the attitude of the mover 101 can be stabilized in the Y direction and the Wz direction. For example, current can be applied to the coil 208 so that the torque in the Wz direction is always 0.

In this way, in the present embodiment, the movement machine difference of the mover 101 in the Z direction and the movement machine difference of the mover 101 in the Y direction of the mover 101 are corrected to thereby control the currents applied to the plurality of coils 202 and 208. Thus, the movement of the mover 101 is controlled so as to be in the target attitude (Y, Z, Wx, Wy, Wz). Therefore, the respective attitudes of the plurality of movers 101 can be controlled with higher accuracy. For example, the operation of the mover 101 is controlled so as to be at the target position in the Z direction by correcting the movement machine difference of the mover 101 in the Z direction and controlling the current values applied to the plurality of coils 202. Thus, the attitude of the mover 101 during being levitated is controlled. Therefore, the position of each of the plurality of movers 101 at the time of levitation can be controlled with higher accuracy.

Next, a control method of the coil 207 that applies thrust in the X direction, which is the transport direction, to the mover 101 will be described. The transport system 1 according to the present embodiment is a transport system with an induction type linear motor. The coil 207 generates electromagnetic force between the coil 207 and the conductive plate 107 of the mover 101 and applies thrust in the X direction, that is, the force component Tx in the X direction to the mover 101. The conductive plate 107 is not particularly limited, and a plate whose electric resistance is relatively small, for example, an aluminum plate is used.

When current is applied, each coil 207 generates a moving magnetic field in the X direction, which is the transport direction, to generate electromagnetic force between the coil 207 and the conductive plate 107. Thereby, each coil 207 causes the mover 101 to generate the force component Tx as the thrust in the X direction, which is the transport direction. When the speed of the mover 101 is insufficient, it is possible to increase the current to be applied to each coil 207 or change the timing of application of current to each coil 207 so that the speed at which the moving magnetic field moves becomes higher.

In the present embodiment, the movement of the movers 101 is controlled to achieve the target transport speed by controlling the current value and/or timing of currents applied to the plurality of coils 207 by correcting for the movement machine difference in the X direction of the movers 101. Thus, the transport speed of each of the plurality of movers 101 can be controlled with higher accuracy.

As described above, the integration controller 301 determines and controls the current instruction values of current to be applied to respective coils 202, 207, and 208. Accordingly, the integration controller 301 controls transportation of the mover 101 on the stator 201 in a contactless manner while controlling in six axes the attitude of the mover 101 being transported by the stator 201. Note that all or a part of the function of the integration controller 301 as the control apparatus may be replaced with the coil controller 302 as well as other control apparatuses.

Note that, although the case where the current of the coil 207 is controlled in the same manner as the current of the coil 202 and the coil 208 has been described in the present embodiment, the embodiment is not limited thereto. For example, in a simpler configuration, an induction motor controller may be connected to the integration controller 301, and the current of each coil 207 may be controlled by the induction motor controller so that a constant moving magnetic field is generated.

As described above, according to the present embodiment, it is possible to apply the force component and the torque component in the six axes (Tx, Ty, Tz, Twx, Twy, Twz) independently to the mover 101. Thus, according to the present embodiment, it is possible to transport the mover 101 in a contactless manner stably in the X direction while stabilizing the attitude of the mover 101 in the Y direction, the Z direction, the Wx direction, the Wy direction, and the Wz direction.

Further, according to the present embodiment, the position and the attitude of the mover 101 can be controlled in consideration of the machine difference Cx of the position of the mover 101 in the X direction, the reading error Cy of the Y-sensor 205, and the reading error Cz of the Z-sensor 206. Thus, it is possible to reduce or avoid the influence of machine differences that may exist for each of the plurality of movers 101. Therefore, according to present embodiment, in the magnetic levitation type transport system 1, the plurality of movers 101 can be transported with higher accuracy.

It should be noted that, although the above description has been made on the case of correcting the movement machine difference in the X direction, the movement machine difference in the Y direction, and the movement machine difference in the Z direction of the mover 101, any one or two of these may be corrected.

Second Embodiment

Figure 18A:
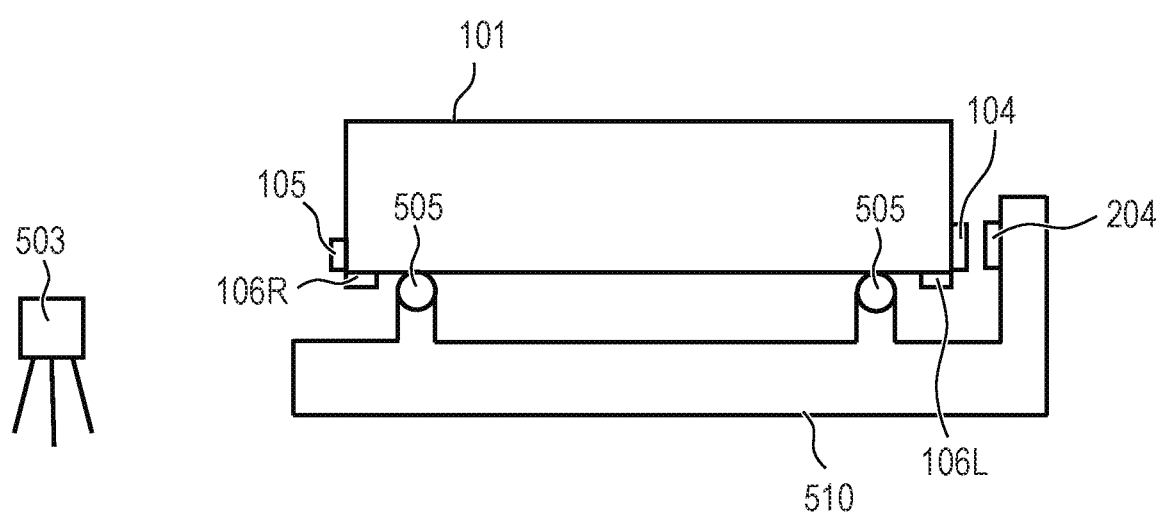
FIG. 18A is a schematic diagram illustrating a method for acquiring machine difference in a position of a mover in the X direction over the entire linear scale in a transport system according to a second embodiment of the present disclosure.

A second embodiment of the present disclosure will be described with reference to FIG. 18A to FIG. 19. Note that the same components as those in the above first embodiment are labeled with the same references, and the description thereof will be omitted or simplified. Note that the correction of the movement machine difference by the present embodiment can be executed in combination with the correction of the movement machine difference by the first embodiment.

Figure 18B:
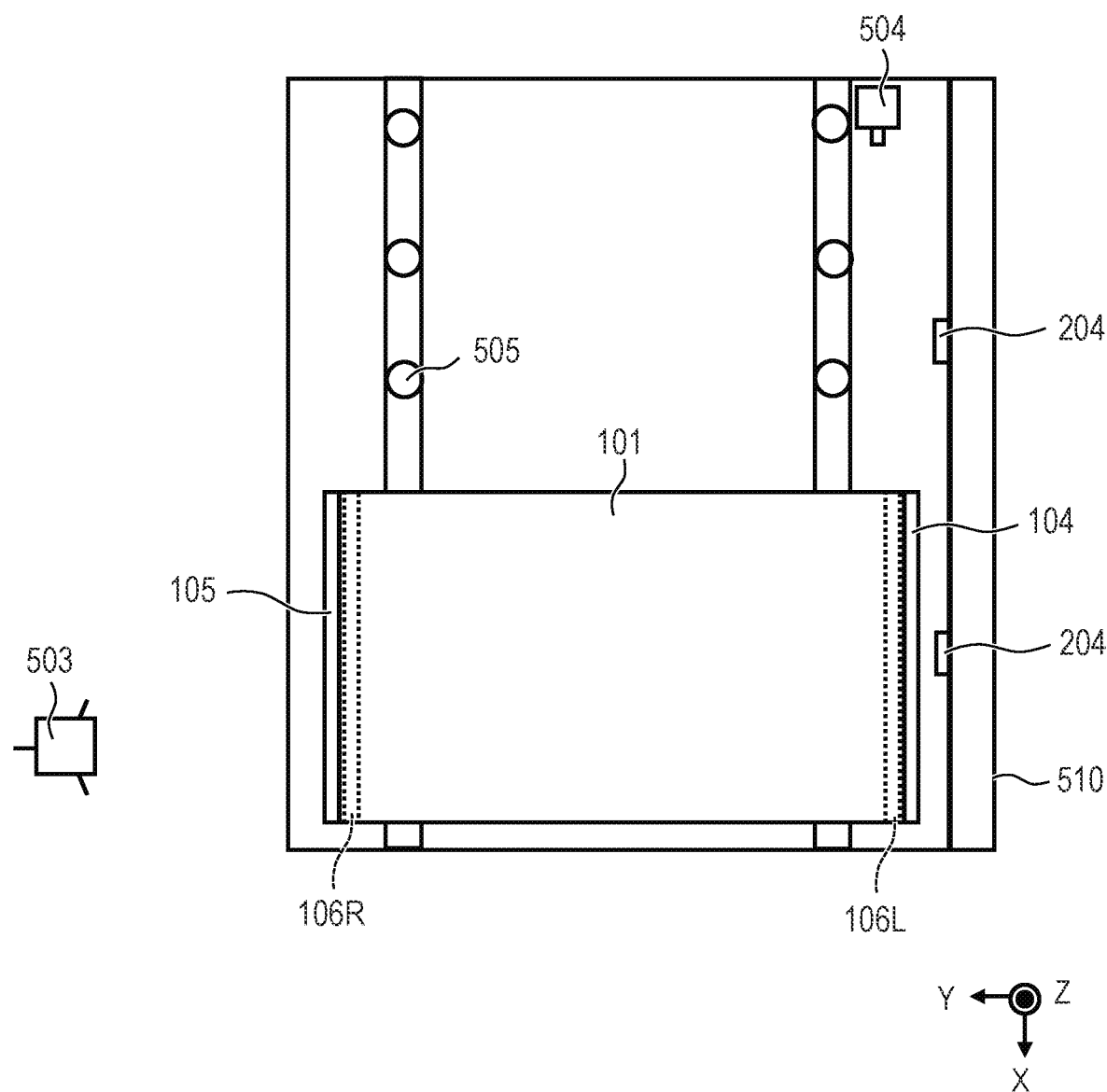
FIG. 18B is a schematic diagram illustrating the method for acquiring the machine difference in the position of the mover in the X direction over the entire linear scale in the transport system according to the second embodiment of the present disclosure.

In the present embodiment, when acquiring a correction value for correcting the movement machine difference of the mover 101, the machine difference of the position of the mover 101 in the X direction is acquired over the entire area of the linear scale 104. Hereinafter, a method of acquiring the mechanical difference of the position of the mover 101 in the X direction over the entire area of the linear scale 104 will be described with reference to FIG. 18A and FIG. 18B. FIG. 18A and FIG. 18B are schematic diagrams illustrating the method of acquiring the mechanical difference of the position of the mover 101 in the X direction over the entire area of the linear scale 104, and illustrates a common measuring jig 510 commonly used for the plurality of movers 101 when the correction value is acquired. FIG. 18A illustrates the common measuring jig 510 as viewed in the –X direction. FIG. 18B illustrates the common measuring jig 510 viewed in the –Z direction.

The common measuring jig 510 has a linear encoder 204 similar to that of the stator 201 and a laser interferometer 504 as a distance measuring means. The linear encoder 204 is attached and installed on the common measuring jig 510 so as to read the linear scale 104 of the mover 101 which is slid in the X direction in the common measuring jig 510. The laser interferometer 504 is attached and installed on the common measuring jig 510 so as to detect the position of the mover 101 in the X direction slid in the X direction in the common measuring jig 500.

The common measuring jig 510 has a plurality of Z-axis rollers 505. The plurality of Z-axis rollers 505 are arranged in two or more lines along the X direction. The Z-axis roller 505 is, for example, a ball roller. The mover 101 is placed on a plurality of lines of the Z-axis rollers 505. The Z-axis rollers 505 can slide the placed mover 101 in the X direction. The common measuring jig 510 may be provided with a Y-axis roller (not illustrated) for regulating the mover 101 in the Y direction when the mover 101 is slid in the X direction.

In the common measuring jig 510, by reading the linear scale 104 of the mover 101 by the linear encoder 204, the position of the mover 101 in the X direction sliding in the X direction in the common measuring jig 510 can be detected. The position of the mover 101 in the X direction sliding in the X direction in the common measuring jig 500 can also be detected by measurement by the laser interferometer 504.

Figure 19:
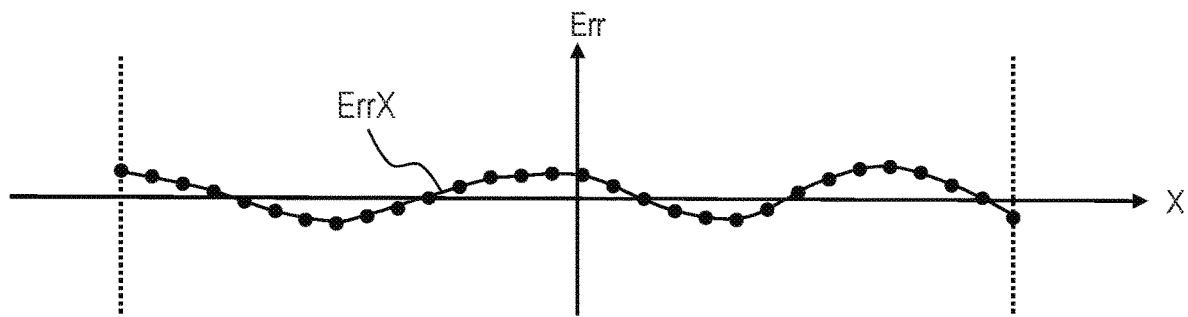
FIG. 19 is a graph showing difference between a laser interferometer measurement and a linear encoder measurement when the mover is slid to be moved in the X direction on a plurality of Z-axis rollers in the transport system according to the second embodiment of the present disclosure.

FIG. 19 is a graph showing, as Err, the difference between the measured value of the laser interferometer 504 and the measured value of the linear encoder 204 when the mover 101 is moved in the X direction by sliding on the plurality of Z-axis rollers 505. Note that, when measuring with the laser interferometer 504, measurement in increments of 1 mm in the X direction may be performed in order to reduce the amount of correction data, for example. When the measured data is used as a correction value, the data between the measurement points can be interpolated from a plurality of measurement points by using a method such as Lagrange interpolation.

The machine difference Cx' of the position of the mover 101 in the X direction can be calculated by the following Equation (X1)'.

$$Cx'=(\text{Ref\_}Lx'-Lx')-(\text{Ref\_}Ex'-Ex') \quad \text{Equation (X1)'}$$

Here, Ex', Lx', Ref_Lx', and Ref_Ex' represent the following, respectively.
- Ex': measured value of the linear encoder 204 attached to the common measuring jig 510
- Lx': measured value of the laser interferometer 504
- Ref_Lx': design value of the position in the X direction from the laser interferometer 504 to the mover 101
- Ref_Ex': design value of the attached position of the linear encoder 204.

The machine difference Cx' can be acquired over the entire area of the linear scale 104 based on the measurement result obtained when the mover 101 is slid by the Z-axis rollers 505 and moved in the X direction. Note that the machine difference Cx' does not necessarily have to be acquired in the entire area of the linear scale 104, but may be acquired in a portion of the linear scale 104.

The machine difference Cx' in the X direction is stored by the integration controller 301 as machine difference information 520 in the X direction in association with the individual ID of the mover 101 registered in the RFID tag 512. In calculating the position X of the mover 101 in the X direction, the machine difference Cx' associated with the individual ID of the mover 101 is considered.

In the mover position calculation function 401, when the machine difference Cx(101b)' which is the machine difference Cx' of the position of the mover 101b in the X direction is considered, the position Pos(101b)' of the mover 101b can be calculated by the following Equation (1c)' instead of the Equation (1c). The machine difference Cx(101b)' may be a value corresponding to the position of the linear scale 104 read by the linear encoder 204c, out of values acquired over the entire area of the linear scale 104.

$$\text{Pos}(101b)'=Sc-Pc-Wz*D+Cx(101b)' \quad \text{Equation (1c)'}$$

The more accurate position of the mover 101b can be acquired by calculating using the equation (1c)' considering the machine difference Cx'.

Thus, in present embodiment, when calculating the position X of the mover 101 in the X direction in the mover position calculation function 401, the machine difference Cx' of the position of the mover 101 in the X direction acquired over the entire area of the linear scale 104 is taken into account. The machine difference Cx' is associated with an individual ID registered in the RFID tag 512 of the mover 101. This makes it possible to correct the machine difference of the individual mover 101. Therefore, in present embodiment, a more accurate current position can be acquired regardless of the position of the mover 101.

Based on the position of the mover 101 obtained as described above, the integration controller 301 can control the transport speed of the mover 101 by maintaining a constant speed, decelerating or accelerating the speed.

In the present embodiment, since the more accurate current position can be acquired regardless of the position of the mover 101, when the mover 101 is transferred at the target transport speed, the mover 101 can be made to follow the target transport speed more accurately. Therefore, the speed ripple which is the speed unevenness with respect to the target transport speed of the mover 101 can be suppressed to be small. Therefore, according to the present embodiment, in the magnetic levitation type transport system 1, the plurality of movers 101 can be conveyed with higher accuracy.

Third Embodiment

A third embodiment of the present disclosure will be described with reference to FIG. 5A, FIG. 5B and FIG. 20. Note that the same components as those in the above first and second embodiments are labeled with the same references, and the description thereof will be omitted or simplified.

In the present embodiment, a method of controlling the position and attitude of the mover 101 using the machine difference information of the natural frequency of the mover 101 will be described. Note that the correction of the movement machine difference by the present embodiment can be executed in combination with the correction of the movement machine difference by the first or second embodiment.

First, the natural frequency of each mover 101 is measured. In the measurement of the natural frequency, as illustrated in FIG. 5A and FIG. 5B, the mover 101 for measuring the natural frequency is supported at the Bessel points 501. With the mover 101 thus supported, an acceleration sensor (not illustrated) is attached to the mover 101 to perform impact excitation using, for example, hammering, and the natural frequency of the mover 101 is measured from the measurement result of the acceleration sensor at that time.

Next, the coefficient of a filter for removing the natural frequency is determined from the measured natural frequency of the mover 101. As the filter for removing the natural frequency, for example, a band-stop filter having a narrow stopband such as a notch filter can be used.

The machine difference of the natural frequency is stored in the storage device as machine difference information 522 (see FIG. 20) of the natural frequency in association with the individual ID of the mover 101 registered in the RFID tag 512 by the integration controller 301. The machine difference of the natural frequency may be stored in an external storage device that can be referenced by the integration controller 301.

An operation correction using the machine difference information of the natural frequency measured as described above will be described in detail with reference to FIG. 20. FIG. 20 is a schematic diagram illustrating an example of a control block for controlling the position and attitude of the mover 101 in the case of correcting the operation using the machine difference information of the natural frequency.

Figure 20:
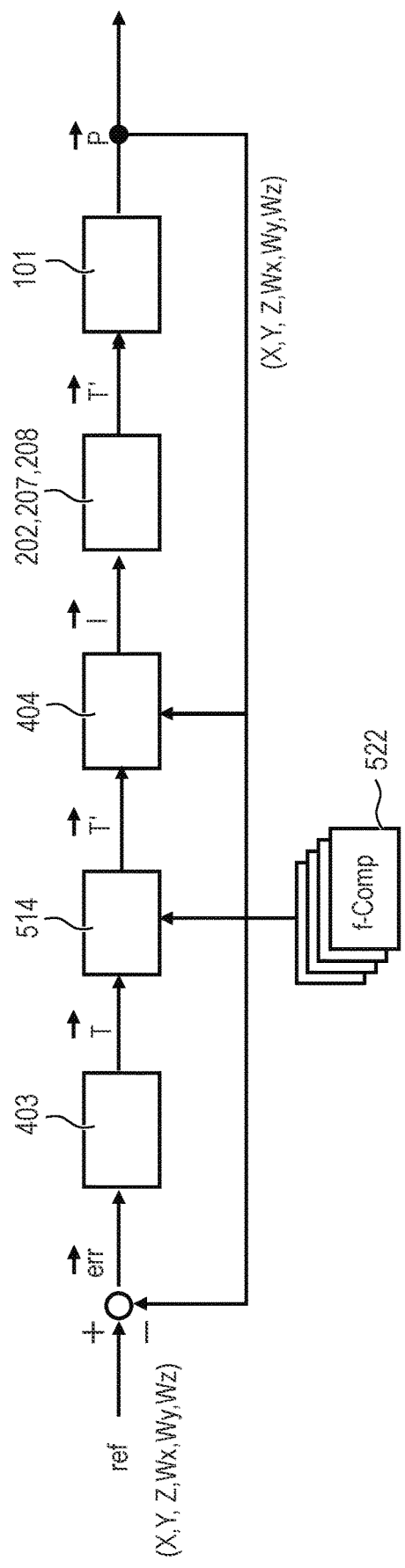
FIG. 20 is a schematic diagram illustrating an example of a control block for controlling the position and attitude of a mover in a transport system according to a third embodiment of the present disclosure.

In FIG. 20, the symbol P denotes the position and the attitude of the mover 101 having (X, Y, Z, Wx, Wy, Wz) as components, the symbol ref denotes a target value of (X, Y, Z, Wx, Wy, Wz), and the symbol err denotes a deviation between the target value ref and the position and the attitude P.

Similar to the case illustrated in FIG. 8, the mover attitude control function 403 calculates force T to be applied to the mover 101 for achieving the target value ref based on the magnitude of the deviation err, the change in the deviation err, the accumulation value of the deviation err, or the like. In present embodiment, the integration controller 301 executes processing using a filter function 514. The filter function 514 applies the filter for removing the natural frequency to the force T to calculate the filtered force T'. When applying the filter for removing the natural frequency, the integration controller 301 determines the filter coefficient of the filter for removing the natural frequency by the filter function 514 from the machine difference information 522 of the natural frequency stored in association with an individual ID registered in an RFID tag 512 of the mover 101.

The coil current calculation function 404 calculates coil current I to be applied to the coils 202, 207, and 208 in order to apply the filtered force T' to the mover 101 based on the filtered force T' and the position and the attitude P. When the coil current I thus calculated are applied to the coils 202, 207, and 208, the filtered force T' works on the mover 101 to change the position and the attitude P to the target value ref.

By configuring the control block in such a way, it is possible to control the position and the attitude P of the mover 101 to a desired target value ref by using the machine difference information of the natural frequency of the mover 101.

In the present embodiment, as described above, in the filter function 514, the filter for removing the natural frequency is applied to the force T to be applied to the mover 101 to calculate the filtered force T'. The filter coefficient of the filter for removing the natural frequency is determined from the machine difference information of the natural frequency stored in association with the individual ID registered in the RFID tag 512 of the mover 101. Thus, the position and the attitude of the individual mover 101 can be controlled. Therefore, according to the present embodiment, the plurality of movers 101 can be transferred with high accuracy.

Fourth Embodiment

Figure 21A:
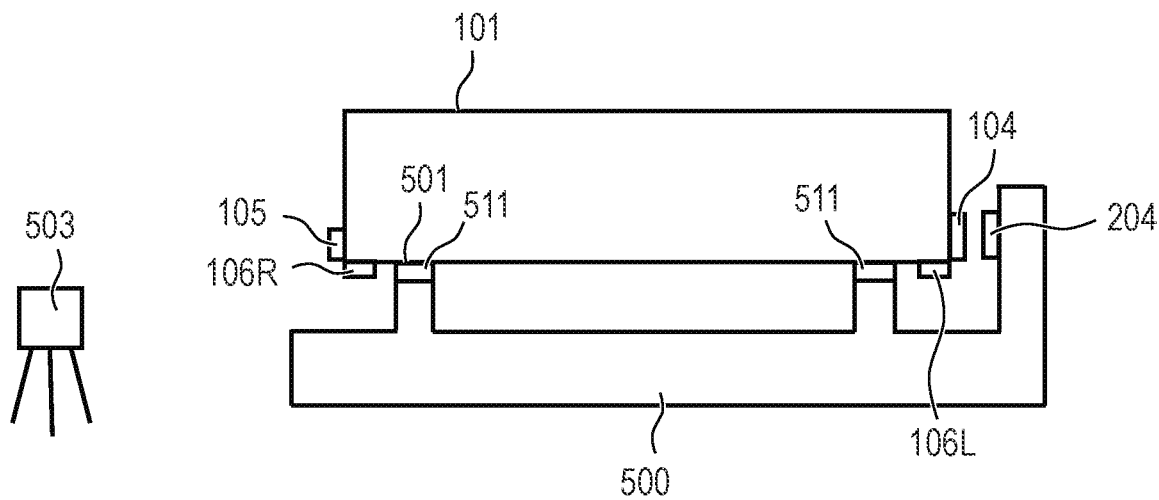
FIG. 21A is a schematic diagram illustrating a method of measuring the weight of a mover in a transport system according to a fourth embodiment of the present disclosure.
Figure 21B:
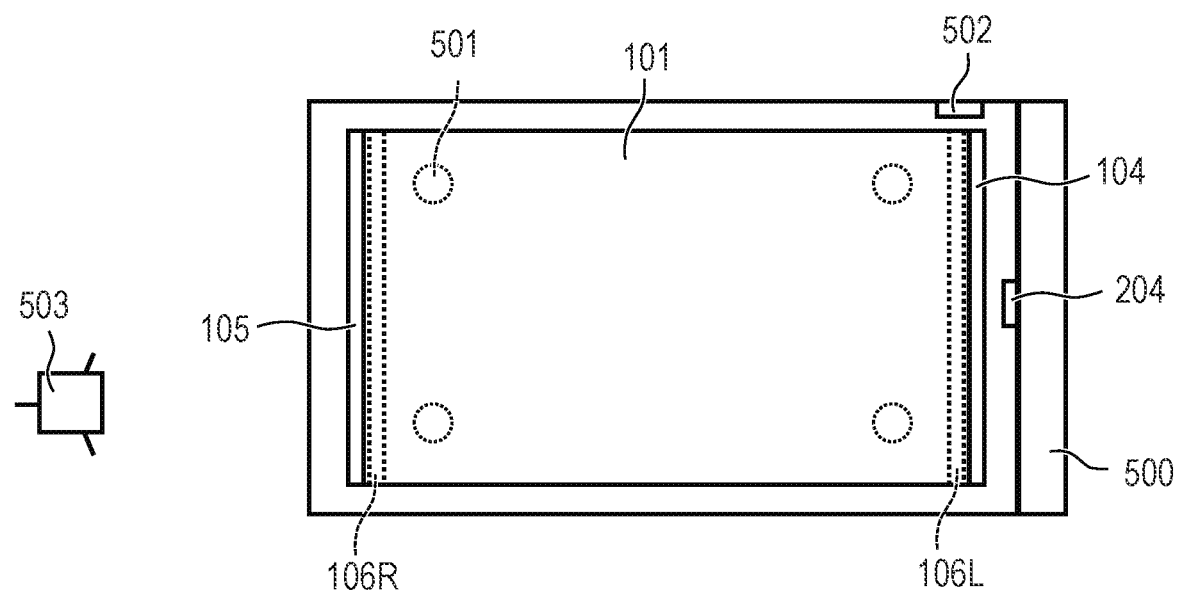
FIG. 21B is a schematic diagram illustrating the method of measuring the weight of the mover in the transport system according to the fourth embodiment of the present disclosure.

A fourth embodiment of the present disclosure will be described with reference to FIG. 21A and FIG. 21B. Note that the same components as those in the above first to third embodiments are labeled with the same references, and the description thereof will be omitted or simplified.

In present embodiment, a case where the weight of the mover 101 is measured will be described with reference to FIG. 21A and FIG. 21B. FIG. 21A and FIG. 21B are schematic diagrams illustrating the method of measuring the weight of the mover 101. FIG. 21A illustrates a common measuring jig 500 viewed in the -X direction. FIG. 21B illustrates the common measuring jig 500 viewed in the -Z direction.

When the weight of the mover 101 is measured, the mover 101 is supported by Bessel points 501 of the mover 101 in the common measuring jig 500 in the same manner as the first embodiment. In present embodiment, a weight sensor 511 for measuring the weight of the mover 101 is installed on a support part for supporting the mover 101 of the common measuring jig 500.

For each of the plurality of movers 101, the mover 101 is installed in the common measuring jig 500, and the weight can be measured by a weight sensor 511. The weight sensor 511 is not particularly limited as long as it can measure the weight of the mover 101, but a load cell or the like can be used.

When the plurality of movers 101 are manufactured, variations in the weight of the plurality of movers 101 may occur due to manufacturing errors or assembly errors of components. From the viewpoint of transporting the plurality of movers 101 with high accuracy, it is preferable that the plurality of movers 101 have small or no variation in weight.

In order to correct the variation in the weight of the mover 101, first, the weight of each of the plurality of movers 101 is measured by the weight sensor 511 as described above. Then, based on the measurement result of the weight, the weight of the plurality of movers 101 is adjusted so that the weights of the plurality of movers 101 are the same by, for example, a method of installing a weight on a part or all of the plurality of movers 101, a method of changing components, or the like. Thus, the variation in the weight of the plurality of movers 101 can be reduced or eliminated. By correcting the variation in the weight in this way, the plurality of movers 101 can be transferred with high accuracy.

Even when the plurality of movers 101 have variation in weight, the plurality of movers 101 can be transferred with high accuracy by correcting the machine difference of the movers 101 as in the first to third embodiment described above.

Modified Embodiments

The present disclosure is not limited to the embodiments described above, and various modifications are possible.

For example, although the cases where the position and the attitude of the mover 101 are controlled in the X direction, the Y direction, the Z direction, the Wx direction, the Wy direction, and the Wz direction have been described as examples in the above embodiments, the embodiment is not limited thereto. The displacement may be acquired in at least any one of directions of the X direction, the Y direction, the Z direction, the Wx direction, the Wy direction, or the Wz direction to control the position and the attitude.

Further, although the magnetic floating type transport system 1 that causes the mover 101 to float and transport the mover 101 in a contactless manner has been described in the above embodiments, the embodiment is not limited thereto. For example, when the mass of the mover 101 or the mass of the workpiece 102 placed on the mover 101 is large and the levitation force to be applied in the vertical direction is large, a static pressure by a fluid such as air may be separately used for levitation to assist the levitation force. The transport system 1 can also be configured as a levitation type transport system for levitating the mover 101 by utilizing static pressure or the like by a fluid instead of electromagnetic force as a levitation force.

Further, although the cases where a predetermined number of lines of a plurality of coils 202, 207, or 208 are arranged have been described as examples in the above embodiments, the embodiment is not limited thereto. A predetermined number of lines of each coil can be arranged in accordance with the yoke plate 103, the conductive plate 107 arranged in the mover 101.

Further, although the case where the mover 101 is provided with the yoke plates 103 and the conductive plate 107 have been described as examples in the above embodiments, the embodiment is not limited thereto. The mover 101 may have a magnet group including a plurality of permanent magnets instead of the yoke plate 103 and the conductive plate 107. The magnet group may include, for example, a plurality of permanent magnets arranged along the X direction.

Further, the transport system according to the present disclosure can be used as a transport system that transports a workpiece together with a mover to an operation area of each process apparatus such as a machine tool that performs each operation process on the workpiece that is an article in a manufacturing system that manufactures an article such as an electronic device. The process apparatus that performs the operation process may be any apparatus such as an apparatus that performs assembly of a component to a workpiece, an apparatus that performs painting, or the like. Further, the article to be manufactured is not limited to a particular article and may be any component.

As described above, the transport system according to the present disclosure can be used to transport a workpiece to an operation area, perform an operation process on the workpiece transported in the operation area, and manufacture an article. Further, the transport object to be transported by the transport system according to the present disclosure may be other than a workpiece. For example, an article other than a workpiece, a living body such as a person or an animal may be the transport object.

According to the present disclosure, a plurality of movers can be transferred with higher accuracy in a levitation type transport system.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-003049, filed Jan. 12, 2021, and Japanese Patent Application No. 2021-190122, filed Nov. 24, 2021, which are hereby incorporated by reference herein in their entirety.

What is claimed is:

1. A transport system comprising:
    a mover configured to be movable in a first direction;
    a stator having a plurality of coils arranged in the first direction and configured to apply force to transport the mover in the first direction while using the plurality of coils, to which current is applied, to levitate the mover in a second direction intersecting the first direction; and
    a control unit configured to control the current applied to the plurality of coils to control operation of the mover,
    wherein the control unit is configured to control the current applied to the plurality of coils using machine difference information of the mover to control an attitude of the mover while the mover is being levitated, and
    wherein the machine difference information includes at least one of a machine difference of natural frequency of the mover or a machine difference of a weight of the mover.

2. The transport system according to claim 1, wherein the machine difference information further includes at least one of a first machine difference of the mover in the first direction, a second machine difference of the mover in the second direction, or a third machine difference of the mover in a third direction intersecting the first direction and the second direction.

3. The transport system according to claim 2, wherein the machine difference information further includes at least one of the first machine difference, the second machine difference, the third machine difference, the machine difference of natural frequency of the mover, or the machine difference of the weight of the mover.

4. The transport system according to claim 2, wherein the control unit controls the mover to achieve a target transport speed by controlling the current applied to the plurality of coils using the first machine difference.

5. The transport system according to claim 2, wherein the control unit controls the mover to achieve a predetermined target for the attitude of the mover by controlling the current applied to the plurality of coils using the second machine difference and the third machine difference.

6. The transport system according to claim 5, wherein the control unit controls the mover to achieve a target position in the second direction by controlling the current applied to the plurality of coils using the second machine difference.

7. The transport system according to claim 1, further comprising a storage unit configured to store the machine difference information for each mover.

8. The transport system according to claim 7,
    wherein the mover includes an information medium in which identification information is registered,
    wherein the machine difference information is associated with the identification information identifying the mover, and
    wherein the control unit is configured to control the current applied to the plurality of coils using the machine difference information read from the information medium.

9. The transport system according to claim 1, wherein the second direction is a perpendicular direction.

10. The transport system according to claim 1, wherein the machine difference information is measured using a common measuring jig for a plurality of the movers.

11. A processing system comprising:
    the transport system according to claim 1; and
    a process apparatus configured to perform processing on a workpiece transported by the mover of the transport system.

12. A method for manufacturing an article by using a processing system having the transport system according to claim 1, and having a process apparatus to perform processing, the method comprising:

transporting a workpiece by using the mover of the transport system; and performing, by using the process apparatus, processing on the workpiece transported by the mover.

13. A film forming apparatus comprising:

a mover configured to be movable in a first direction;

a stator having a plurality of coils arranged in the first direction and configured to apply force to transport the mover in the first direction while using the plurality of coils, to which current is applied, to levitate the mover in a second direction intersecting the first direction;

a control unit configured to control the current applied to the plurality of coils to control operation of the mover; and a film deposition source that includes a metal or an oxide and is provided below an area through which the mover is to pass, wherein the control unit is configured to control the current applied to the plurality of coils using machine difference information of the mover to control an attitude of the mover while the mover is being levitated, wherein the control unit controls the attitude of the mover while the mover is being levitated when the mover is transported in the first direction so that a distance between the mover and the film deposition source is constant, and wherein the machine difference information includes a second machine difference of the mover in the second direction, and at least one of a machine difference of natural frequency of the mover or a machine difference of a weight of the mover.

14. The film forming apparatus according to claim 13, wherein the control unit controls the mover to achieve a target transport speed by controlling the current applied to the plurality of coils using a first machine difference of the mover in the first direction.

15. The film forming apparatus according to claim 13, wherein the control unit controls the mover to achieve a predetermined target for the attitude of the mover by controlling the current applied to the plurality of coils using the second machine difference of the mover in the second direction or a third machine difference of the mover in a third direction intersecting the first direction and the second direction.

16. The film forming apparatus according to claim 13, wherein the second direction is a perpendicular direction.

17. A method for manufacturing an article by using the film forming apparatus according to claim 13, wherein the second direction is a perpendicular direction, the method comprising:

transporting a workpiece by using the mover; and forming a film, by using the film forming apparatus, on the workpiece transported by the mover.

* * * * *